US012735555B2

(12) United States Patent
Kimura et al.

(10) Patent No.: US 12,735,555 B2
(45) Date of Patent: Sep. 15, 2026

(54) BIODEGRADABLE RESIN COMPOSITION AND MOLDED BODY

(71) Applicant: TOPPAN INC., Tokyo (JP)

(72) Inventors: Asuka Kimura, Tokyo (JP); Hideaki Iwamoto, Tokyo (JP); Seiji Furuya, Tokyo (JP)

(73) Assignee: TOPPAN INC., Tokyo (JP)

( * ) Notice: Subject to any disclaimer, the term of this patent is extended or adjusted under 35 U.S.C. 154(b) by 600 days.

(21) Appl. No.: 18/268,532

(22) PCT Filed: Dec. 24, 2021

(86) PCT No.: PCT/JP2021/048302

§ 371 (c)(1),
(2) Date: Jun. 20, 2023

(87) PCT Pub. No.: WO2022/138935

PCT Pub. Date: Jun. 30, 2022

(65) Prior Publication Data

US 2024/0076472 A1 Mar. 7, 2024

(30) Foreign Application Priority Data

Dec. 25, 2020 (JP) ................................ 2020-217315

(51) Int. Cl.
*C08K 5/00* (2006.01)
*C08B 37/00* (2006.01)

(52) U.S. Cl.
CPC ........ *C08K 5/0033* (2013.01); *C08B 37/0084* (2013.01); *C08J 2300/16* (2013.01); *C08J 2305/04* (2013.01)

(58) Field of Classification Search
CPC ............... C08K 5/0033; C08B 37/0084; C08J 2300/16; C08J 2305/04

(Continued)

(56) References Cited

U.S. PATENT DOCUMENTS

2005/0214541 A1 9/2005 Berrada et al.
2015/0274942 A1 10/2015 Meena et al.

FOREIGN PATENT DOCUMENTS

| | | | | |
|---|---|---|---|---|
| CN | 109627718 A | | 4/2019 | |
| CN | 110229484 A | | 9/2019 | |
| CN | 111961320 A | * | 11/2020 | ............. A01G 18/00 |
| JP | 2001-323177 A | | 11/2001 | |
| JP | 2005-042283 A | | 2/2005 | |
| JP | 2005-068346 A | | 3/2005 | |

(Continued)

OTHER PUBLICATIONS

Chang et al., CN 111961320 A machine translation in English, Nov. 20, 2020. (Year: 2020).*

(Continued)

*Primary Examiner* — David T Karst
(74) *Attorney, Agent, or Firm* — Squire Patton Boggs (US) LLP

(57) ABSTRACT

Provided is a biodegradable resin composition having a high degradation rate. The biodegradable resin composition is a biodegradable resin composition having water holding properties. The biodegradable resin composition preferably contains a biodegradable resin and is preferably capable of holding 0.007 g or more and 15.0 g or less of water relative to 1 g of the biodegradable resin. The biodegradable resin composition preferably contains a seaweed-derived polysaccharide as a hydrolysis accelerator that improves the water holding properties and accelerates hydrolysis of the biodegradable resin. The seaweed-derived polysaccharide is preferably, for example, fucoidan, laminarin, alginic acid, or an alginate. The biodegradable resin composition preferably contains a photocatalytically active substance that degrades the biodegradable resin.

10 Claims, 43 Drawing Sheets

(58) Field of Classification Search
USPC .......................................................... 523/124
See application file for complete search history.

(56) References Cited

FOREIGN PATENT DOCUMENTS

| | | | |
|---|---|---|---|
| JP | 3646193 | B3 | 5/2005 |
| JP | 2007-533780 | A | 11/2007 |
| JP | 2016-500721 | A | 1/2016 |
| JP | 2016-053128 | A | 4/2016 |

OTHER PUBLICATIONS

Gao, et al., "The effect of Alginate on Mechanical, Thermal, and Rheological Properties of Nano Calcium Carbonate-Filled Polylactic Acid Composites", Polymer Engineering and Science; Jul. 25, 2019; vol. 59(9); pp. 1882-1888. XP093205725; DOI: 10.1002/pen.25188.

Marra, et al., "Effect of TiO2 and ZnO on PLA degradation in various media", Advanced Materials Science; Apr. 24, 2017; vol. 2(2); pp. 1-8. XP093205753; DOI: 10.15761/AMS.1000122.

Tserki, et al., "Development of Biodegradable Composites with Treated and Compatibilized Lignocellulosic Fibers", Journal of Applied Polymer Science; Mar. 29, 2006; vol. 100; pp. 4703-4710. XP093205801; DOI: 10.1002/app.23240.

International Search Report mailed Mar. 15, 2022, for International Application No. PCT/JP2021/048302, with English translation, 7 pages.

International Preliminary Report on Patentability mailed Jun. 13, 2023 for International Application No. PCT/JP2021/048302, with English translation, 6 pages.

* cited by examiner

BIODEGRADABLE RESIN COMPOSITION AND MOLDED BODY

CROSS-REFERENCE

This application is a National Stage filing under 35 U.S.C. § 371 of International Patent Application No. PCT/JP2021/048302, filed Dec. 24, 2021, which claims the benefit of and priority to Japanese Patent Application No. 2020-217315, filed Dec. 25, 2020, the contents of all of which are hereby incorporated by reference in their entireties for all purposes.

TECHNICAL FIELD

The present disclosure relates to a biodegradable resin composition and a molded body.

BACKGROUND ART

Disposal of packages and materials formed from resin materials has caused environmental pollution or other problems, and biodegradable resins have been increasingly used for packages and materials. Biodegradable resins to be used for packages and materials contain an additive to have such a controlled degradation rate as to be degraded by microorganisms or the like after disposal while maintaining the mechanical strength as a resin molded product (for example, PTL 1).

CITATION LIST

Patent Literature

PTL 1: JP 3646193 B

SUMMARY OF INVENTION

Technical Problem

Conventional biodegradable resins, however, have an insufficient degradation rate for some applications of the biodegradable resins. In particular, when a biodegradable resin is used for food packages, agricultural materials, gardening materials, and the like, adhering food scraps or residual soil prevents reuse or recycle of the resin, which is often wasted. Hence, biodegradable resins after disposal are required to be quickly degraded.

In such circumstances, the present disclosure is intended to provide a biodegradable resin composition and a molded body having a high degradation rate.

Solution to Problem

To solve the above problems, a biodegradable resin composition pertaining to an aspect of the present disclosure is a biodegradable resin composition having water holding properties.

A molded body pertaining to an aspect of the present disclosure is formed from the above biodegradable resin composition.

Advantageous Effects of Invention

According to the present disclosure, a biodegradable resin composition and a molded body having a higher degradation rate than conventional can be provided.

DESCRIPTION OF EMBODIMENTS

Figure 1:
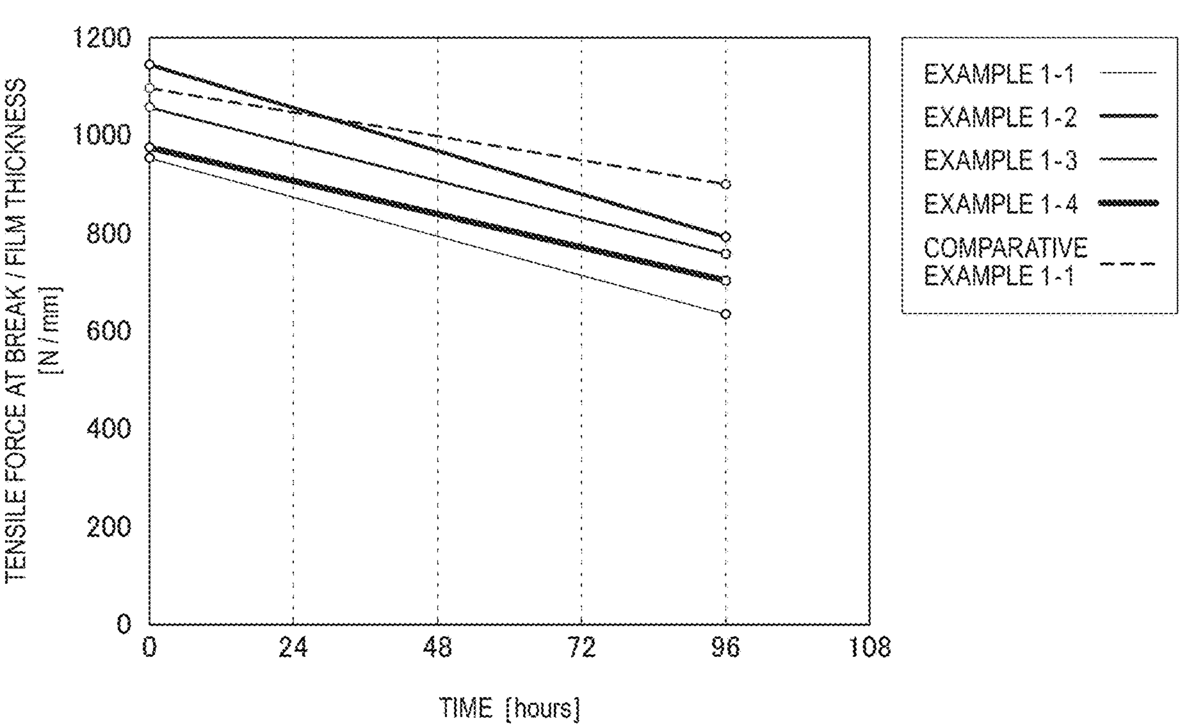
FIG. 1 is a graph illustrating of the accelerated degradation test results in Example 1.

Embodiments of the present disclosure will now be described with reference to drawings. The embodiments described below are however merely illustrative, and are not intended to exclude various modifications or technology not clearly described below. The present disclosure may be implemented with various modifications (for example, by combining embodiments) without departing from the scope of the disclosure.

A biodegradable resin composition and a molded body pertaining to the present disclosure will be described. The biodegradable resin composition pertaining to the present embodiment is applicable to various products including commonly used packages, agricultural materials, and gardening materials, and is particularly suitable for products that are easily contaminated, difficult to reuse or recycle, and easily disposed of as waste.

<Constitution of Biodegradable Resin Composition>

The biodegradable resin composition contains a biodegradable resin and has water holding properties for accelerating hydrolysis of the biodegradable resin. The biodegradable resin composition is preferably capable of holding 0.007 g or more and 15.0 g or less of water relative to 1 g of the biodegradable resin, more preferably capable of holding 0.008 g or more and 15.0 g or less of water, and even more preferably capable of holding 0.008 g or more and 0.5 g or less of water.

Such a biodegradable resin composition preferably contains, together with the biodegradable resin, a biodegradation accelerator that accelerates biodegradation of the biodegradable resin.

The biodegradable resin, the biodegradation accelerator, and other additives will be described in detail.

(Biodegradable Resin)

The biodegradable resin contained in the biodegradable resin composition pertaining to the present disclosure is preferably a biodegradable resin that has ester bonds and is hydrolyzed to cleave the ester bonds into low molecular compounds. Examples of the biodegradable resin include polylactic acid (PLA), polybutylene succinate (PBS), and polybutylene adipate terephthalate (PBAT).

(Biodegradation Accelerator)

The biodegradation accelerator is an additive that functions to accelerate hydrolysis of a biodegradable resin. The biodegradation accelerator is thus preferably a material that improves the water holding capacity of a biodegradable resin. When a biodegradable resin composition containing a biodegradation accelerator is, for example, disposed of in soil, the biodegradable resin composition activates soil microorganisms. Accordingly, a biodegradable resin composition containing a biodegradation accelerator not only accelerates the hydrolysis of the biodegradable resin but also improves the biodegradability of the biodegradable resin. The biodegradation accelerator is preferably a naturally derived substance from the viewpoint of effect on the environment.

Such a biodegradation accelerator is, for example, preferably seaweed-derived polysaccharides and more preferably contains at least one of fucoidan, laminarin, alginic acid, and an alginate. The biodegradation accelerator may contain mannitol in addition to at least one of fucoidan, laminarin, alginic acid, and an alginate. The biodegradation accelerator is even more preferably alginic acid or an alginate. The alginate is preferably at least one of sodium alginate, potassium alginate, and calcium alginate and is more preferably sodium alginate. In the description, fucoidan, mannitol, and laminarin are preferably used together with alginic acid or an alginate.

The biodegradation accelerator is preferably other than neutral, or is preferably acidic or basic.

Such a biodegradation accelerator may be extracted from natural materials or may be produced industrially.

The biodegradation accelerator is preferably contained at 0.01% by mass or more relative to the biodegradable resin, more preferably contained at 0.1% by mass or more, and even more preferably contained at 0.5% by mass or more. When the biodegradation accelerator is contained within the range, hydrolysis of the biodegradable resin is accelerated. The biodegradation accelerator is preferably contained at a higher content because the hydrolysis acceleration effect improves.

In contrast, from the viewpoint of the strength of a resin molded body and from the viewpoint of resin moldability using a biodegradable resin, the biodegradation accelerator is preferably contained at a smaller content relative to the biodegradable resin. For example, a molded body formed from a biodegradable resin is supposedly formed by injection molding, blow molding, vacuum molding, inflation molding, extrusion molding, or the like. In this case, the biodegradation accelerator is preferably contained at 50% by mass or less relative to the biodegradable resin, more preferably contained at 30% by mass or less, and even more preferably contained at 10% by mass or less. In addition, various molding methods can be expected: for example, a solvent or the like is used to increase the melt flow rate (MFR), and a die coater with a T-die is used to form a coating on the surface of a film or a sheet. Depending on the molding method, the amount of the biodegradation accelerator relative to the biodegradable resin is not necessarily 50% by mass or less and can be more than 50% by mass.

As described above, to improve the strength of a resin molded body and to appropriately perform resin molding while improving the effect of hydrolysing the biodegradable resin, the hydrolysis accelerator is preferably contained at 0.01% by mass or more and 50% by mass or less relative to the biodegradable resin, more preferably contained at 0.1% by mass or more and 30% by mass or less, and even more preferably contained at 0.5% by mass or more and 10% by mass or less.

The upper limit of the content of the hydrolysis accelerator can be appropriately set depending on how to mold the biodegradable resin.

A molded body formed from the biodegradable resin containing such a hydrolysis accelerator is preferably capable of holding 0.007 g or more and 15.0 g or less of water relative to 1 g of the biodegradable resin, more preferably capable of holding 0.008 g or more and 15.0 g or less of water, and even more preferably capable of holding 0.008 g or more and 0.5 g or less of water. The biodegradable resin contained in 1 $cm^3$ of the molded body is preferably capable of holding 0.009 g or more and 15.0 g or less of water. The molded body is also preferably capable of holding 0.009 g or more and 15.0 g or less of water in 1 $cm^3$.

(Photocatalytically Active Substance)

A photocatalytically active substance is a catalyst that has a function to decompose a biodegradable resin by light (photodegradability). The photocatalytically active substance accelerates decomposition of a light-exposed portion of a biodegradable resin and allows a non-light-exposed portion to remain. Accordingly, the biodegradable resin is degraded into a plurality of fine pieces, and the surface area of the remaining biodegradable resin is increased. The biodegradability is thus further improved.

When a photocatalytically active substance contained in a biodegradable resin composition is exposed to light, the photocatalytically active substance oxidizes water in air or in water or reduces oxygen to generate active oxygen and oxidatively degrades the biodegradable resin. Photodegradation of a biodegradable resin by such a photocatalytically active substance occurs in an earlier stage than biodegradation of the biodegradable resin. Hence, the photocatalytically active substance degrades a biodegradable resin into low molecular compounds to increase the surface area of the biodegradable resin before the biodegradable resin is biodegraded, and can further accelerate the biodegradation of the biodegradable resin.

Examples of the photocatalytically active substance include titanium oxide and tungsten oxide.

The photocatalyst is preferably contained at 0.5% by mass or more and 10% by mass or less relative to the total amount of the biodegradable resin composition, and more preferably contained at 1.0% by mass or more and 5.0% by mass or less. A photocatalyst contained within the range can exert photodegradability on a biodegradable resin. The upper limit of the content of the photocatalytically active substance can be appropriately set depending on how to mold the biodegradable resin.

(Other Additives)

The biodegradable resin composition may contain other additives that accelerate degradation of the biodegradable resin. For example, the biodegradable resin composition may further contain an organic material or an inorganic material that is mixed with the biodegradable resin and is decomposed by itself to allow the biodegradable resin to remain.

Such an organic material is, for example, preferably plant fibers or plant pieces and is more preferably rice bran, old rice, rice straw, rice hulls, wheat hulls, bran, soybean chaff, coffee grounds, tea grounds, coconut shells, bagasse, wood powder, wastepaper, starch, or the like.

The inorganic material is, for example, preferably calcium carbonate.

The organic material and the inorganic material is, for example, preferably in the filler form for the following reasons. When the organic material is in the filler form, or when the biodegradable resin composition contains an organic filler, the organic filler itself easily decomposes to make holes in a molded body of the biodegradable resin composition or to deform a molded body, and easily increases the surface area. When the inorganic material is in the filler form, or when the biodegradable resin composition contains an inorganic filler, a biodegradable resin around the inorganic filler decomposes, and the inorganic filler falls off from the biodegradable resin. This makes holes in a molded body of the biodegradable resin composition to deform the molded body of the biodegradable resin composition, and easily increases the surface area.

<Resin Molded Body>

The above biodegradable resin composition is preferably molded into a processed product such as a molded body, a film, and a sheet.

The molded body is formed, for example, by molding such as injection molding, blow molding, and vacuum molding to have an intended shape.

The film is formed, for example, by inflation molding to have an intended thickness.

The sheet is formed, for example, by extrusion molding to have an intended thickness.

In addition, the resin molded body is formed, for example, by using a die coater on the surface of a film or a sheet of a different material to have an intended thickness.

EXAMPLE

The biodegradable resin composition of the present disclosure will next be described in detail with reference to examples.

Example 1

Biodegradable resin compositions were prepared while the additive added to a biodegradable resin was changed, and the tensile strength of each test piece formed from the biodegradable resin compositions was determined.

Example 1-1

To polylactic acid (PLA) as a biodegradable resin, an alginic acid mixture containing 30% by mass of alginic acid, 5% by mass of laminarin, 10% by mass of fucoidan, and 8% by mass of mannitol was added to prepare a biodegradable resin composition of Example 1-1. The biodegradable resin composition contained the alginic acid mixture in an amount of 0.5% by mass.

Example 1-2

Substantially the same procedure as in Example 1-1 was performed except that alginic acid was added as the additive, and a biodegradable resin composition of Example 1-2 was prepared.

Example 1-3

Substantially the same procedure as in Example 1-1 was performed except that sodium alginate was added as the additive, and a biodegradable resin composition of Example 1-3 was prepared.

Example 1-4

Substantially the same procedure as in Example 1-1 was performed except that fucoidan was added as the additive, and a biodegradable resin composition of Example 1-4 was prepared.

Comparative Example 1-1

Substantially the same procedure as in Example 1-1 was performed except that no additive was added, and a biodegradable resin composition of Comparative Example 1-1 was prepared.

[Evaluation]

(Tensile Test)

The biodegradable resin compositions described in Examples and Comparative Example were subjected to extrusion molding to yield resin films. The film thickness of each resin film in Examples 1-1 to 1-3 and Comparative Example 1-1 was 0.4 mm, and that in Example 1-4 was 0.5 mm. From each resin film in Examples and Comparative Example, five rectangular test pieces (samples) each having a dimension of 100 mm in the tensile direction and a dimension of 15 mm in a direction orthogonal to the tensile direction were cut out.

The test piece was then fix to a tensile tester (manufactured by Shimadzu Corporation, AG-X 10 kN) at a chuck distance of 50 mm. The test piece was pulled from both ends under a condition at a tensile speed of 500 mm/min, at a temperature of 23° C. and a humidity of 50% RH, and the tensile force when the test piece was broken was measured. The measurement was performed five times (for the five samples), and the average of the measurement results was calculated as the tensile force at break for each of Examples and Comparative Example.

(Accelerated Degradation Test)

The average of the measurement results in the tensile test in each of Examples and Comparative Example was regarded as the tensile force at break before test (0 hours storage) (initial tensile force).

Five test pieces (samples) prepared substantially the same manner as in the tensile test were stored at a temperature of 60° C. and a humidity of 80% RH for 96 hours. The measurement was then performed five times (for the five samples) in substantially the same conditions as in the tensile test for each of Examples and Comparative Example, and the average of the measurement results was calculated as the tensile force at break after test (tensile force after decomposition) for each of Examples and Comparative Example.

(Molecular Weight Measurement)

A test piece formed from the biodegradable resin composition described in each of Examples and Comparative Example was subjected to gel permeation chromatography (GPC) before and after the storage in a constant temperature and humidity chamber (accelerated degradation test) and before and after the weathering test (metal halide lamp irradiation), and changes in molecular weight of each test piece were determined. The GPC analysis conditions were as described below.

Column: three semimicro columns for high-performance analysis (manufactured by SHOWA DENKO K.K., Shodex GPC KF-405LHQ)

Flow rate: 0.30 mL/min

Detector: high speed GPC apparatus (manufactured by Tosoh Corporation, HLC-8220GPC)

Detection condition: differential refractive index (RI: refractive index)

Injection volume: 40 μl

Column temperature: 40° C.

Eluent: chloroform

Figure 2A:
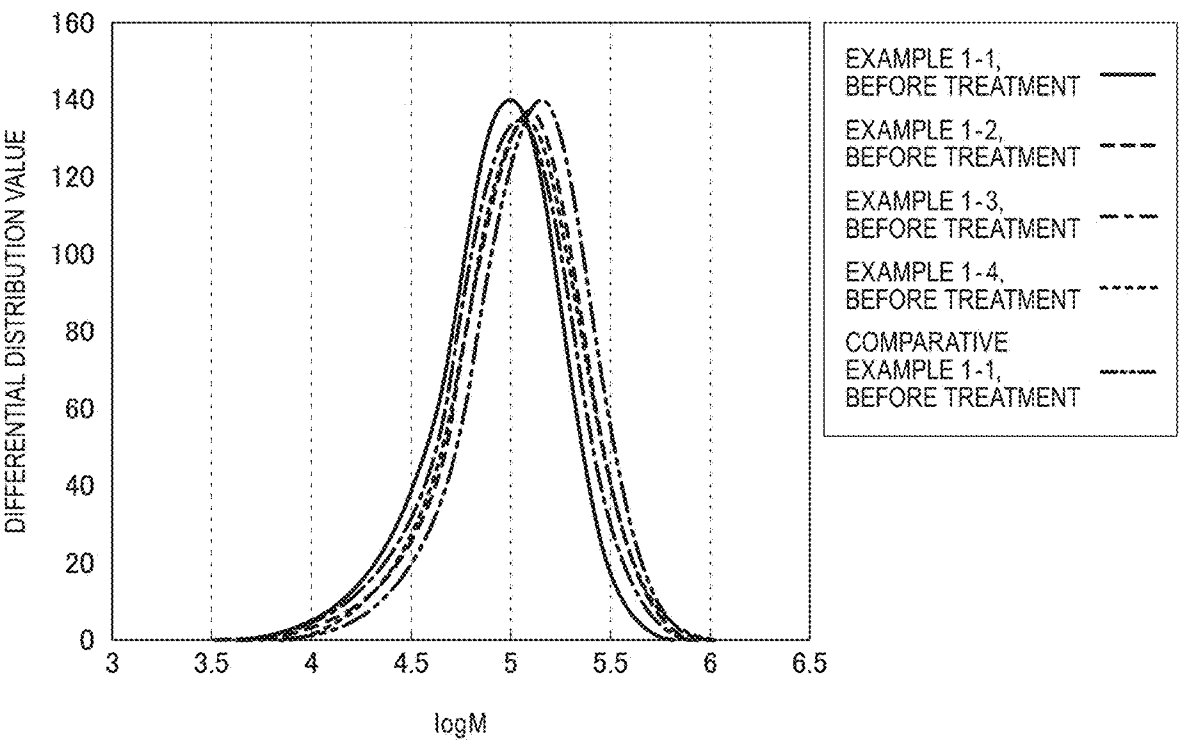
FIG. 2A is a graph illustrating the molecular weight measurement results before and after the accelerated degradation test in Example 1.
Figure 2B:
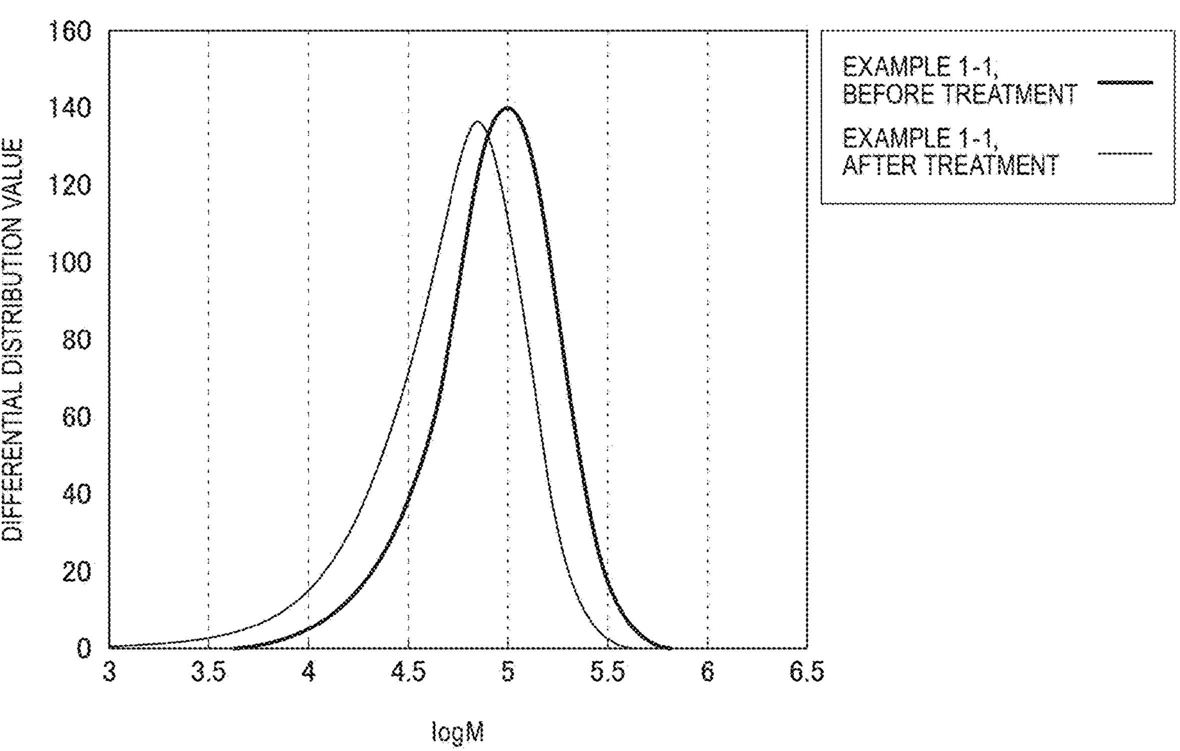
FIG. 2B is a graph illustrating the molecular weight measurement results before and after the accelerated degradation test in Example 1-1.
Figure 2C:
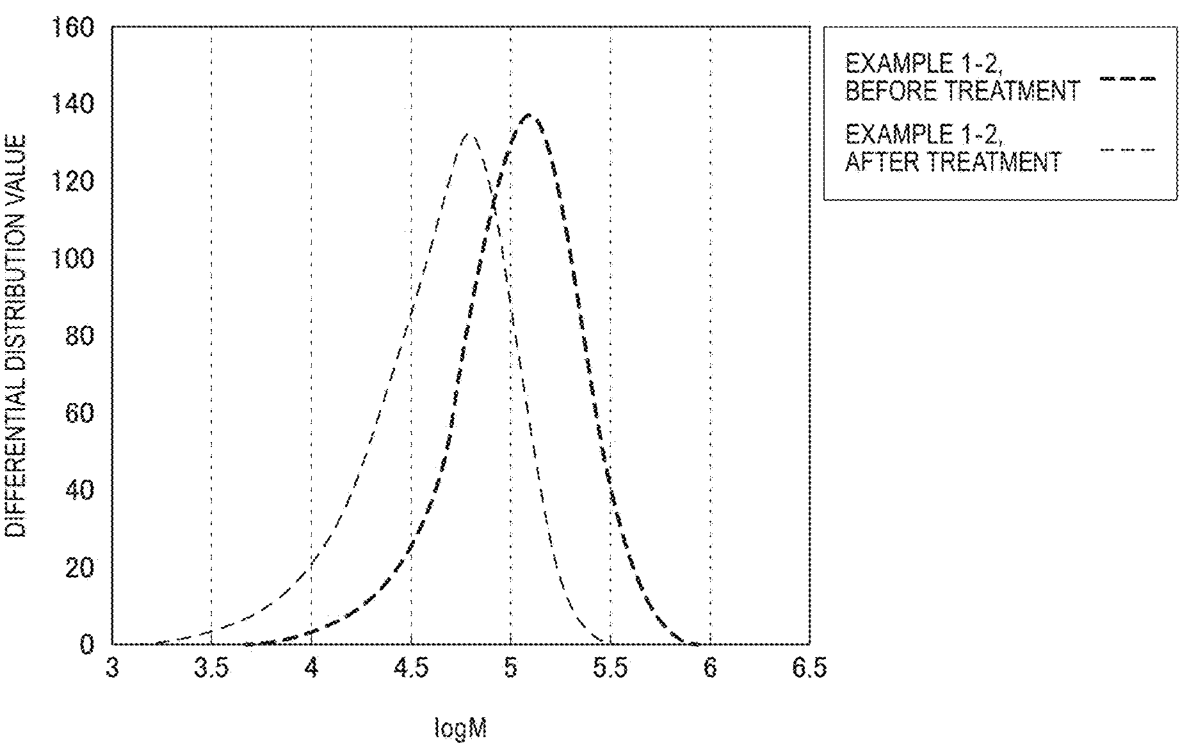
FIG. 2C is a graph illustrating the molecular weight measurement results before and after the accelerated degradation test in Example 1-2.
Figure 2D:
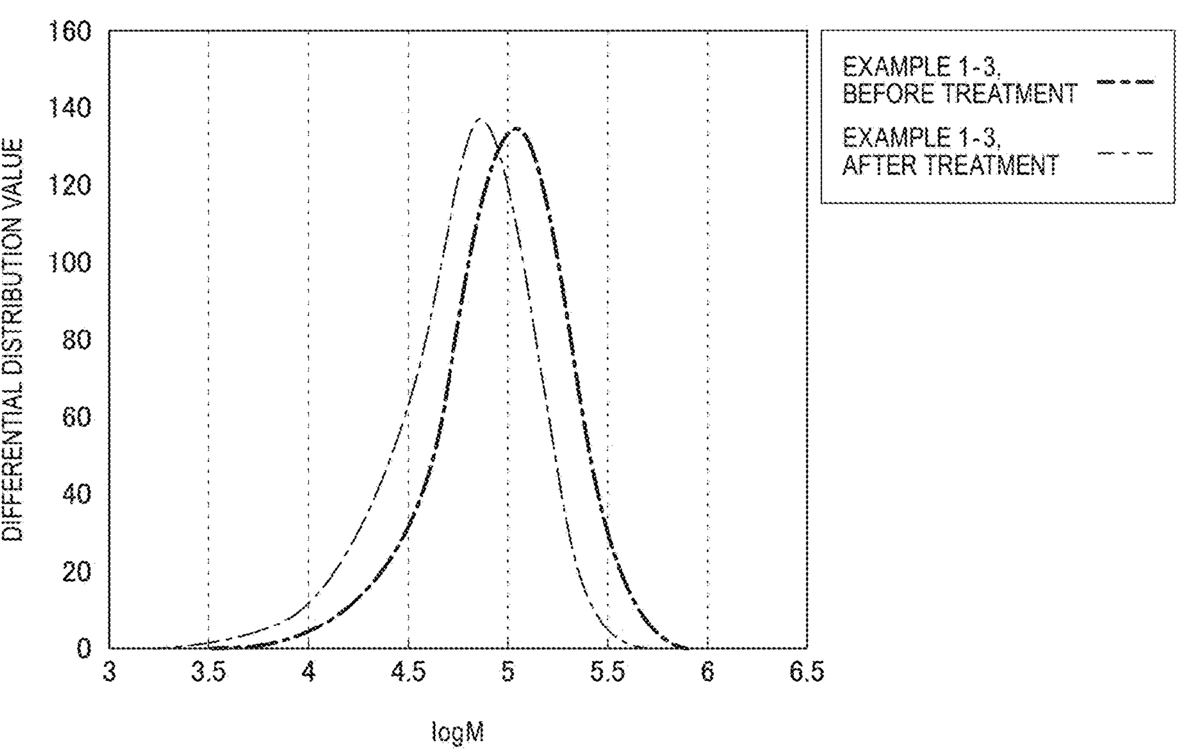
FIG. 2D is a graph illustrating the molecular weight measurement results before and after the accelerated degradation test in Example 1-3.
Figure 2E:
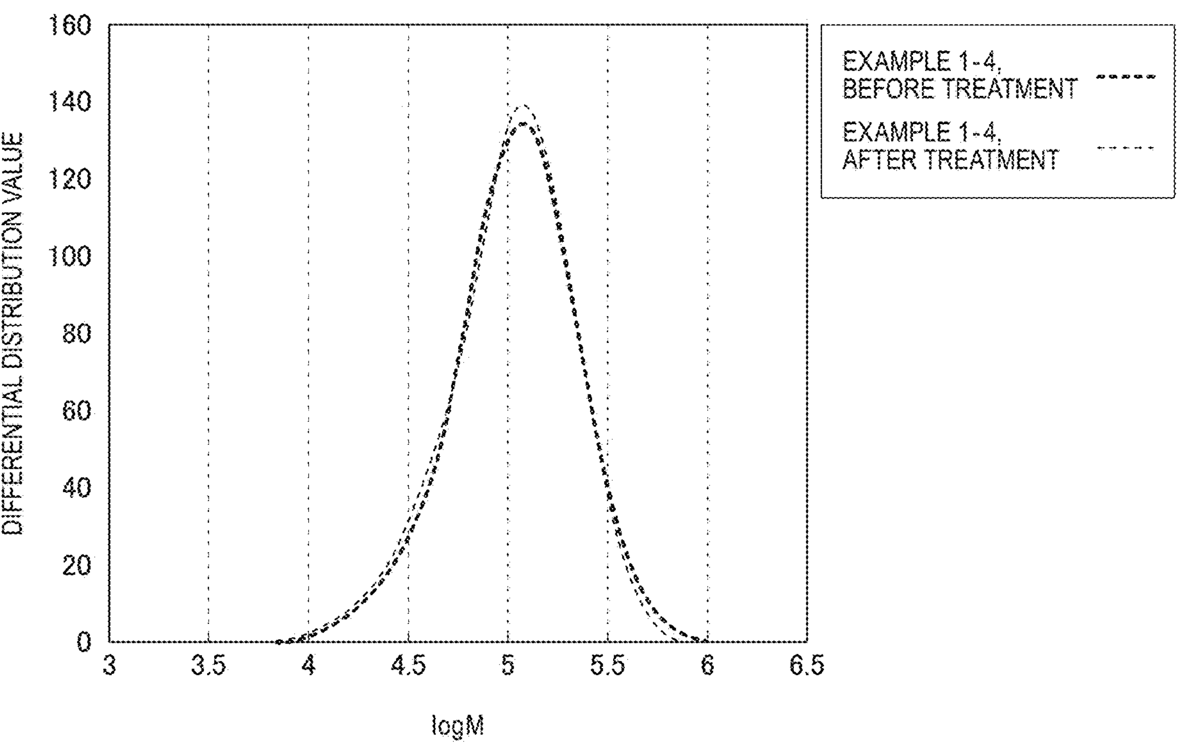
FIG. 2E is a graph illustrating the molecular weight measurement results before and after the accelerated degradation test in Example 1-4.
Figure 2F:
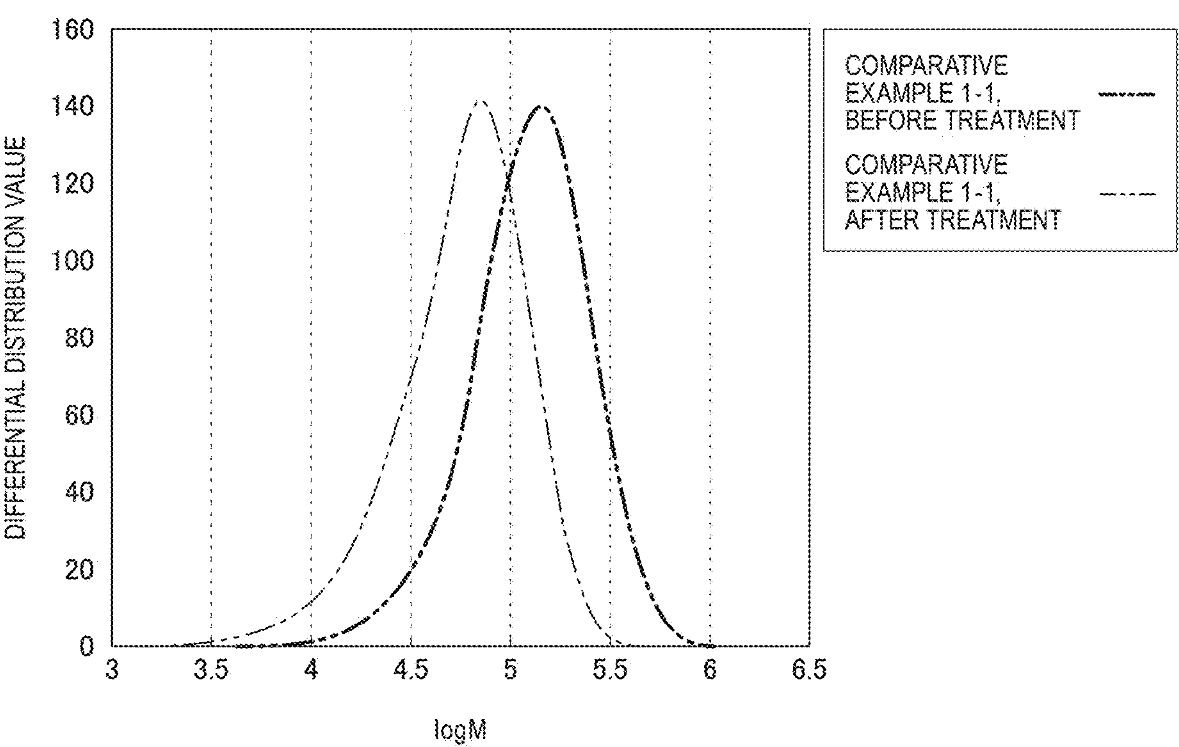
FIG. 2F is a graph illustrating the molecular weight measurement results before and after the accelerated degradation test in Comparative Example 1-1.

Table 1 shows the evaluation results of tensile force at break to film thickness of the test pieces before the accelerated degradation test (0 hours storage) and after the accelerated degradation test. FIG. 1 is a graph illustrating the results of the accelerated degradation test. Table 2 shows the evaluation results of molecular weight changes before and after the accelerated degradation test. FIG. 2A to FIG. 2F are graphs illustrating changes in molecular weight before and after the accelerated degradation test. FIG. 2A is a graph illustrating the molecular weights in Examples and Comparative Example before the accelerated degradation test; FIG. 2B is a graph illustrating a change in molecular weight before and after the accelerated degradation test in Example 1-1; FIG. 2C is a graph illustrating a change in molecular weight before and after the accelerated degradation test in Example 1-2;

FIG. 2D is a graph illustrating a change in molecular weight before and after the accelerated degradation test in Example 1-3; FIG. 2E is a graph illustrating a change in molecular weight before and after the accelerated degradation test in Example 1-4; and FIG. 2F is a graph illustrating a change in molecular weight before and after the accelerated degradation test in Comparative Example 1-1.

TABLE 1

| | Bio-degradable resin | Biodegradation accelerator: Material | Biodegradation accelerator: Amount [% by mass] | Tensile test: Film thickness [mm] | Tensile test: Tensile force [N] | Tensile test: Tensile force/film thickness [N/mm] | Accelerated degradation test: Film thickness [mm] | Accelerated degradation test: Tensile force [N] | Accelerated degradation test: Tensile force/film thickness [N/mm] |
|---|---|---|---|---|---|---|---|---|---|
| Ex. 1-1 | PLA | Alginic acid/laminarin/fucoidan/mannitol | 0.5 | 0.4 | 390.6 | 952.7 | 0.4 | 253.6 | 633.9 |
| Ex. 1-2 | PLA | Alginic acid | 0.5 | 0.4 | 457.4 | 1143.5 | 0.4 | 316.7 | 791.8 |
| Ex. 1-3 | PLA | Sodium alginate | 0.5 | 0.4 | 413.9 | 1118.6 | 0.4 | 294.9 | 797.0 |
| Ex. 1-4 | PLA | Fucoidan | 0.5 | 0.5 | 465.3 | 930.7 | 0.5 | 336.5 | 672.9 |
| Comp. Ex. 1-1 | PLA | — | — | 0.4 | 438.5 | 1096.2 | 0.4 | 359.6 | 899.0 |

TABLE 2

| | | Bio-degradable resin | Biodegradation accelerator: Material | Biodegradation accelerator: Amount [% by mass] | Number average molecular weight Mn | Weight average molecular weight Mw | Poly-dispersity Mw/Mn | Mn reduction rate | Mw reduction rate |
|---|---|---|---|---|---|---|---|---|---|
| Ex. 1-1 | Before treatment | PLA | Alginic acid/laminarin/fucoidan/mannitol | 0.5 | $6.10 \times 10^4$ | $11.00 \times 10^4$ | 1.80 | — | — |
| | After treatment | PLA | Alginic acid/laminarin/fucoidan/mannitol | 0.5 | $3.40 \times 10^4$ | $6.90 \times 10^4$ | 2.03 | 55.74 | 62.73 |
| Ex. 1-2 | Before treatment | PLA | Alginic acid | 0.5 | $7.60 \times 10^4$ | $14.00 \times 10^4$ | 1.84 | — | — |
| | After treatment | PLA | Alginic acid | 0.5 | $5.10 \times 10^4$ | $9.40 \times 10^4$ | 1.84 | 67.11 | 67.14 |
| Ex. 1-3 | Before treatment | PLA | Sodium alginate | 0.5 | $6.9 \times 10^4$ | $12 \times 10^4$ | 1.74 | — | — |
| | After treatment | PLA | Sodium alginate | 0.5 | $4.2 \times 10^4$ | $7.8 \times 10^4$ | 1.86 | 60.87 | 65.00 |
| Ex. 1-4 | Before treatment | PLA | Fucoidan | 0.5 | $8.10 \times 10^4$ | $14.00 \times 10^4$ | 1.73 | — | — |
| | After treatment | PLA | Fucoidan | 0.5 | $5.00 \times 10^4$ | $8.40 \times 10^4$ | 1.68 | 61.73 | 60.00 |
| Comp. Ex. 1-1 | Before treatment | PLA | — | — | $8.30 \times 10^4$ | $14.00 \times 10^4$ | 1.69 | — | — |
| | After treatment | PLA | — | — | $4.10 \times 10^4$ | $7.3 \times 10^4$ | 1.78 | 52.14 | 52.14 |

As shown in Table 1 and FIG. 1, the test pieces formed from the biodegradable resin compositions of Example 1-1 to Example 1-4, in which alginic acid or an alginate was added to a biodegradable resin to achieve water holding properties, had lower breaking strengths (tensile force at break to film thickness) than the test piece formed from the biodegradable resin composition of Comparative Example 1-1, in which no additive was added. In particular, the test pieces formed from the biodegradable resin composition of Example 1-1, in which the alginic acid mixture was added to the biodegradable resin, from the biodegradable resin composition of Example 1-3, in which sodium alginate was added, and from the biodegradable resin composition of Example 1-4, in which fucoidan was added, had lower breaking strengths than the test piece formed from the biodegradable resin composition of Comparative Example 1-1 in both the tensile test and the accelerated degradation test.

From the accelerated degradation test results, the test pieces formed from the biodegradable resin compositions of Example 1-1 to Example 1-3, in which the alginic acid mixture, alginic acid, or sodium alginate was added, had lower breaking strengths after the accelerated degradation test than the test piece formed from the biodegradable resin composition of Comparative Example 1-1. Accordingly, the test pieces formed from the biodegradable resin compositions of Example 1-1 to Example 1-3 markedly decomposed in a humid environment. This is probably because water holding properties of alginic acid particularly accelerate decomposition.

From the accelerated degradation test results, the test piece formed from the biodegradable resin composition of Example 1-2, in which alginic acid was added, had a higher initial breaking strength and a lower breaking strength after the accelerated degradation test than the test piece formed from the biodegradable resin composition of Comparative Example 1-1. This is particularly preferred because a resin product has high strength at the early stage of formation (when used) but is then rapidly decomposed by hydrolysis to promote microbial degradation.

As shown in Table 2 and FIG. 2A, before the accelerated degradation test, the test pieces formed from the biodegradable resin compositions of Example 1-1 to Example 1-4, in which the alginic acid mixture, alginic acid, an alginate, or fucoidan was added, had peak tops that were shifted to the left in the graph and had lower molecular weights as compared with the test piece formed from the biodegradable resin composition of Comparative Example 1-1, in which no additive was added. The molecular weights of the test pieces formed from the biodegradable resin compositions of Example 1-1 to Example 1-4 decreased after the accelerated degradation test as illustrated in FIG. 2B to FIG. 2E, and the reduction rate of molecular weight was larger than that in Comparative Example 1-1 as shown in Table 2.

Example 2

Biodegradable resin compositions were prepared while the amount of the alginic acid mixture added to the biodegradable resin was changed, and the tensile strengths of test pieces formed from the biodegradable resin compositions were determined.

Example 2-1

Substantially the same procedure as in Example 1-1 was performed while the amount of alginic acid mixture was 0.5% by mass, and a biodegradable resin composition of Example 2-1 was prepared.

Example 2-2

Substantially the same procedure as for the biodegradable resin composition in Example 2-1 was performed except that the amount of the alginic acid mixture was 1.0% by mass, and a biodegradable resin composition of Example 2-2 was prepared.

Comparative Example 2-1

Substantially the same procedure as for the biodegradable resin composition in Example 2-1 was performed except that no alginic acid mixture was added, and a biodegradable resin composition of Comparative Example 2-1 was prepared. Comparative Example 2-1 had substantially the same constitution as Comparative Example 1-1.

[Evaluation]

(Tensile Test)

As with Example 1, test pieces formed from the biodegradable resin compositions described in Examples and Comparative Example were subjected to tensile test, and the average tensile forces at break were determined.

(Accelerated Degradation Test)

As with Example 1, test pieces formed from the biodegradable resin compositions described in Examples and Comparative Example were subjected to accelerated degradation test, and the average tensile forces at break were determined.

(Weathering Test)

Test pieces formed from the biodegradable resin compositions described in Examples and Comparative Example (before the accelerated degradation test) were subjected to metal halide lamp irradiation under the following conditions. The test pieces were then subjected to tensile test under substantially the same conditions as in the tensile test in Example 1, and the average tensile force at break of the test pieces after the metal halide lamp irradiation was determined. The breaking strength after the metal halide lamp irradiation relative to the film thickness of the test piece was then calculated.

Temperature: 60° C.

Humidity: 50% RH

Water spray cycle: 18 min/2 hours

Irradiance: 1.5 kW/m$^2$ (metal halide lamp wavelength: 295 nm to 450 nm)

Irradiation time: 8 hours

After the metal halide lamp irradiation, the surface of the test piece formed from the biodegradable resin composition described in each of Examples and Comparative Example was observed under a scanning electron microscope (SEM).

(Molecular Weight Measurement)

Test pieces formed from the biodegradable resin compositions described in Examples and Comparative Example were subjected to gel permeation chromatography (GPC) before and after the storage in a constant temperature and humidity chamber (accelerated degradation test) and before and after the weathering test (metal halide lamp irradiation), and a change in molecular weight of each test piece was determined. The GPC analysis conditions were substantially the same as in Example 1.

After the metal halide lamp irradiation, the test pieces formed from the biodegradable resin compositions described in Examples and Comparative Example were subjected to gel permeation chromatography, and the molecular weight of each test piece was determined. The GPC analysis conditions were substantially the same as above. The metal halide lamp irradiation conditions were substantially the same as in the weathering test in Example 2.

Separately, the test piece formed from the biodegradable resin composition described in Comparative Example 1-1 was subjected to metal halide lamp irradiation for twice as long (i.e., 16 hours) and then was subjected to gel permeation chromatography, and the molecular weight of the test piece was determined.

Table 3 shows the evaluation results of the accelerated degradation test and the weathering test. Table 4 shows the evaluation results of molecular weight change before and after the accelerated degradation test, and Table 5 shows the evaluation results of molecular weight change before and after the weathering test.

Figure 3:
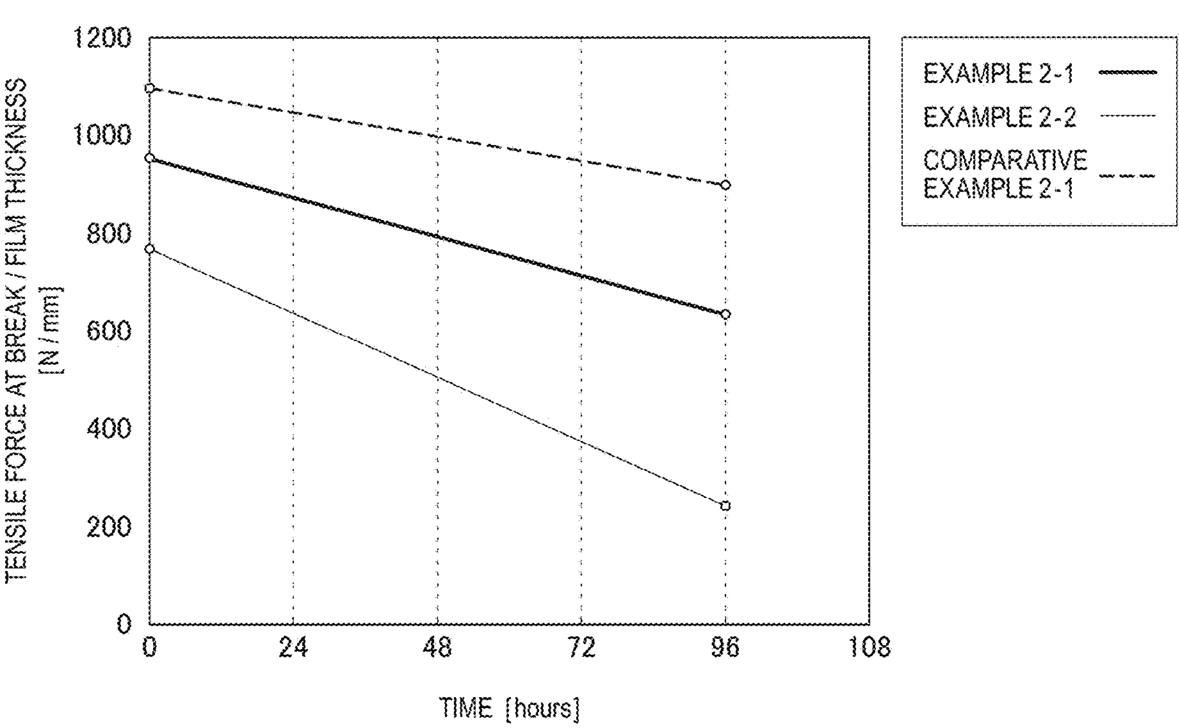
FIG. 3 is a graph illustrating of the accelerated degradation test results in Example 2.
Figure 4:
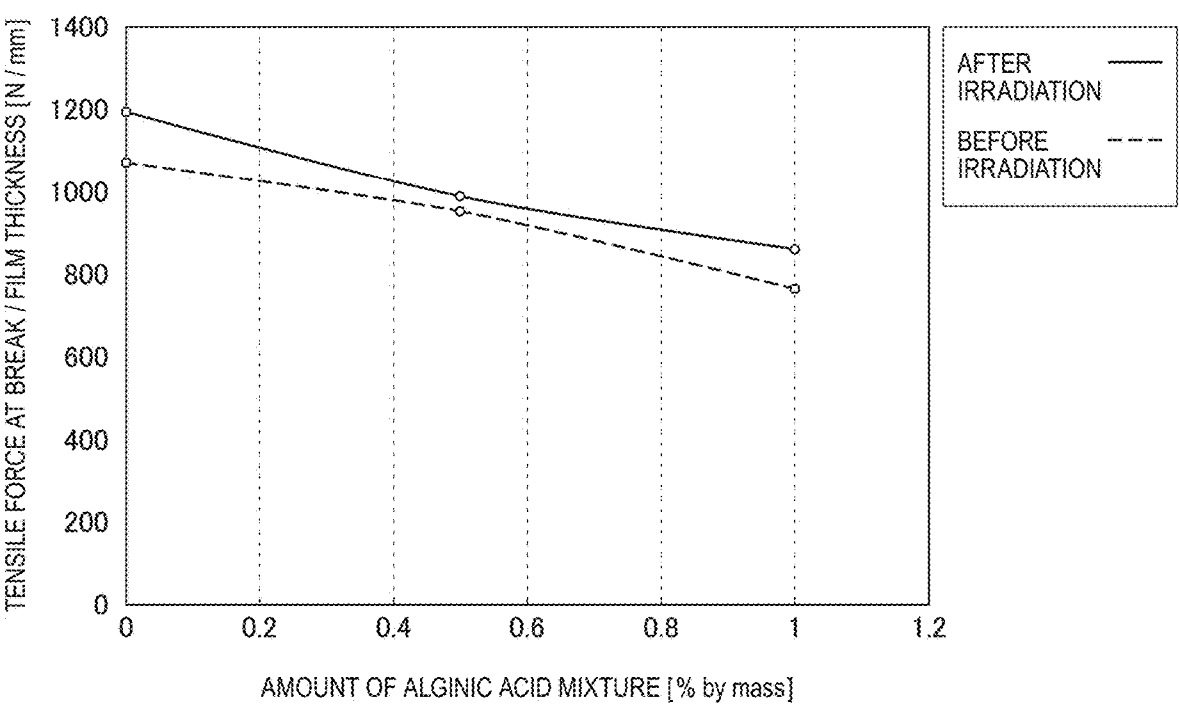
FIG. 4 is a graph illustrating of the weathering test results in Example 2.
Figure 5A:
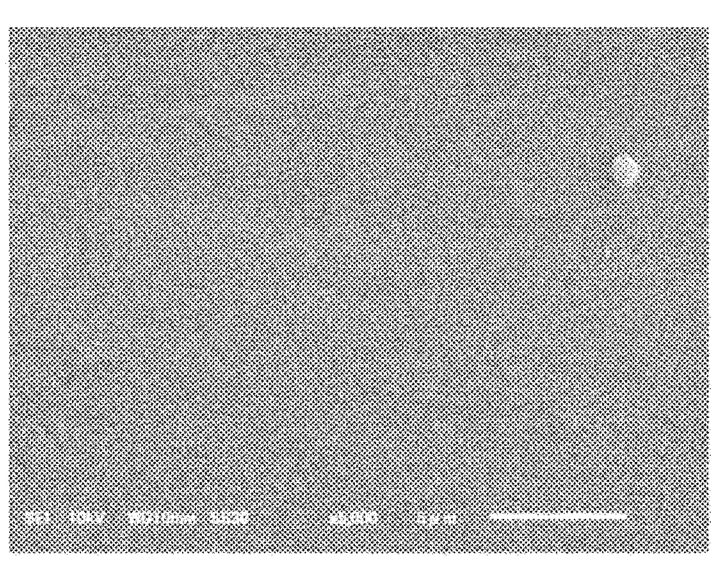
FIG. 5A is a scanning electron microscope image of the observed surface of the test piece before the tests in Example 2-1.
Figure 5B:
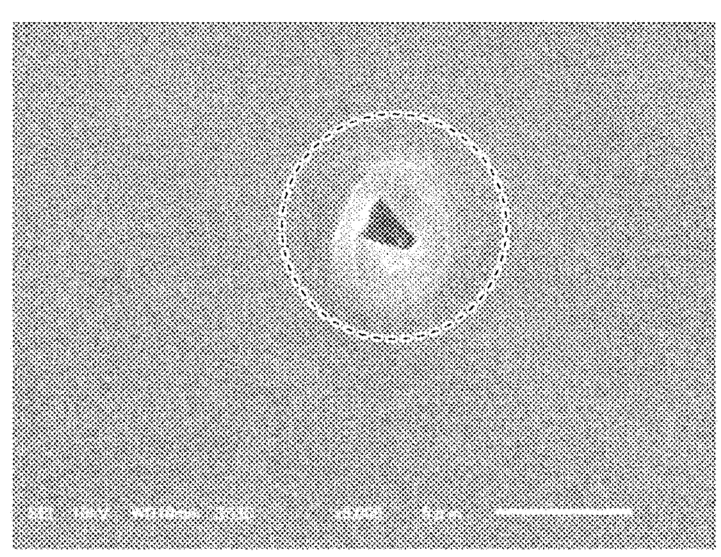
FIG. 5B is a scanning electron microscope image of the observed surface of the test piece after the accelerated degradation test in Example 2-1.
Figure 5C:
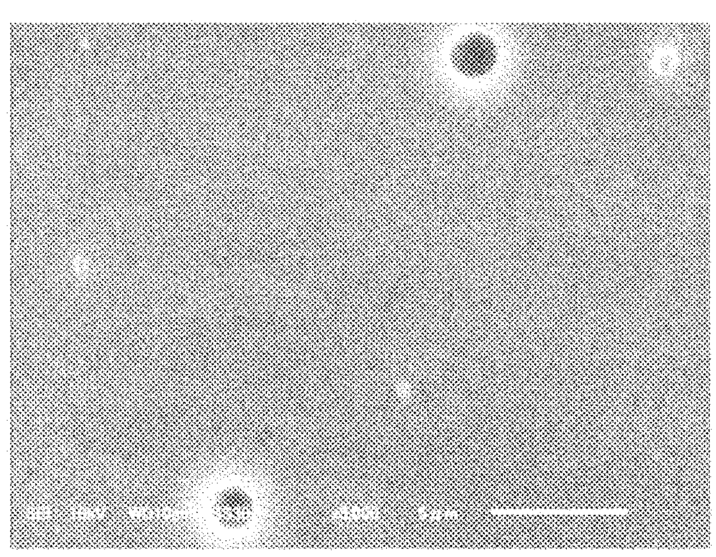
FIG. 5C is a scanning electron microscope image of the observed surface of the test piece after the weathering test in Example 2-1.
Figure 6A:
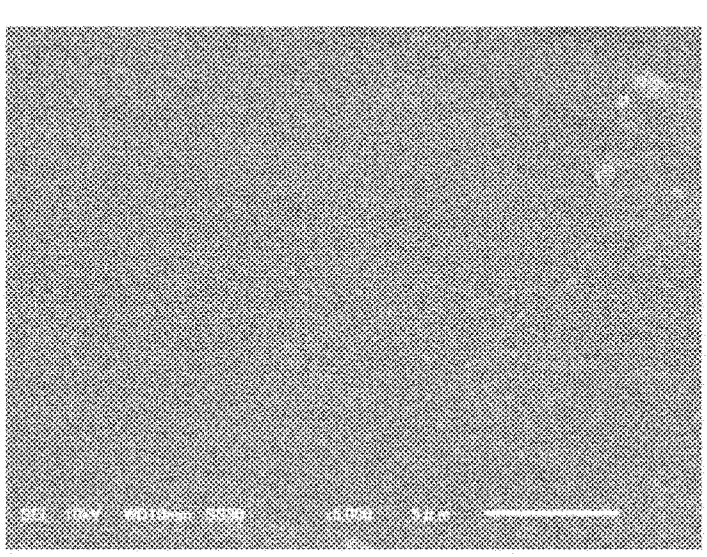
FIG. 6A is a scanning electron microscope image of the observed surface of the test piece before the tests in Example 2-2.
Figure 6B:
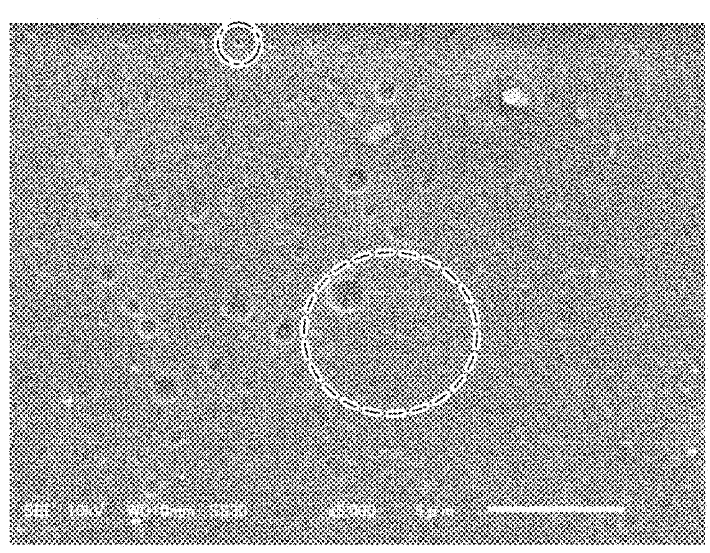
FIG. 6B is a scanning electron microscope image of the observed surface of the test piece after the accelerated degradation test in Example 2-2.
Figure 6C:
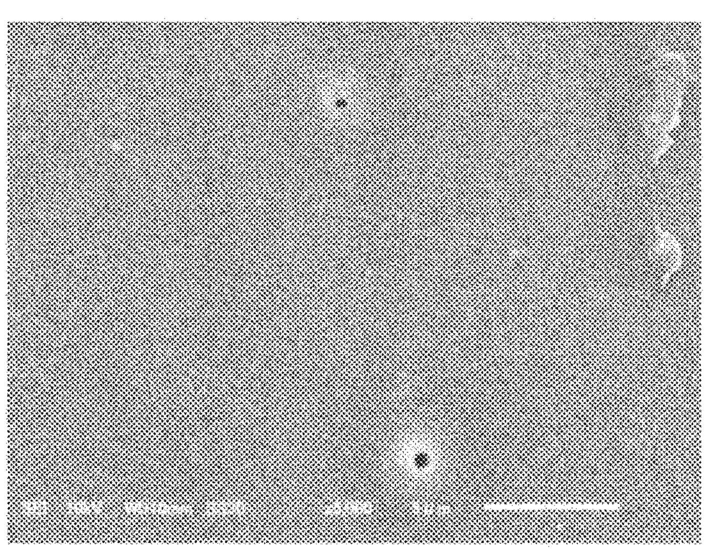
FIG. 6C is a scanning electron microscope image of the observed surface of the test piece after the weathering test in Example 2-2.
Figure 7A:
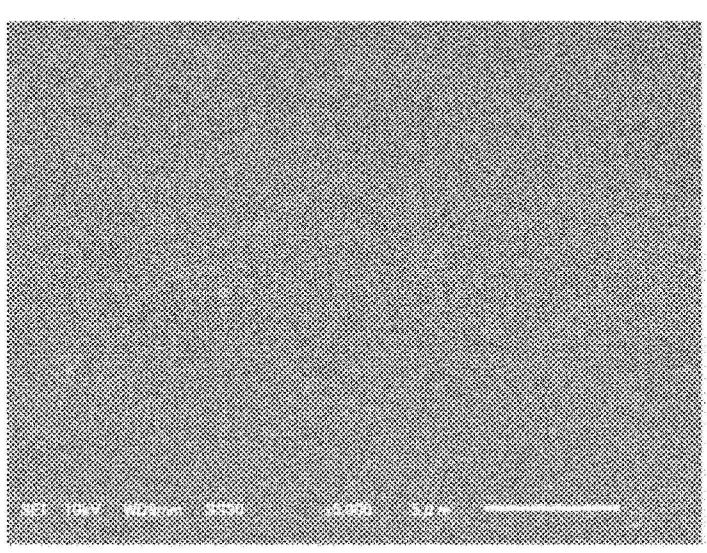
FIG. 7A is a scanning electron microscope image of the observed surface of the test piece before the tests in Comparative Example 2-1.
Figure 7B:
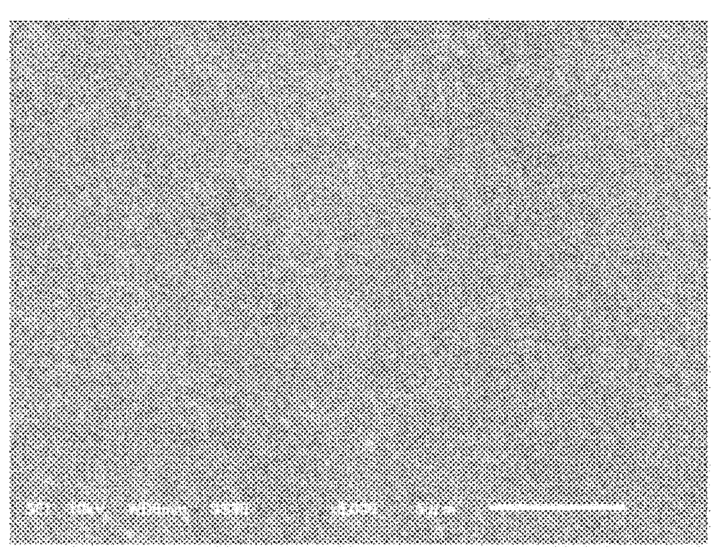
FIG. 7B is a scanning electron microscope image of the observed surface of the test piece after the accelerated degradation test in Comparative Example 2-1.
Figure 7C:
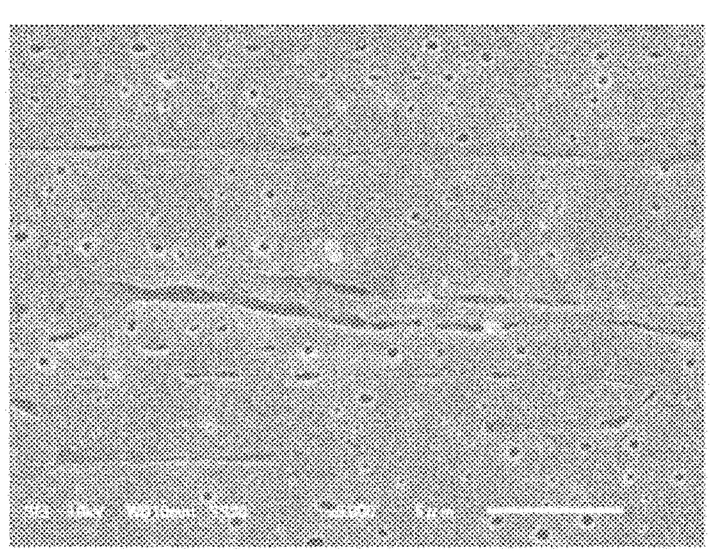
FIG. 7C is a scanning electron microscope image of the observed surface of the test piece after the weathering test in Comparative Example 2-1.
Figure 8:
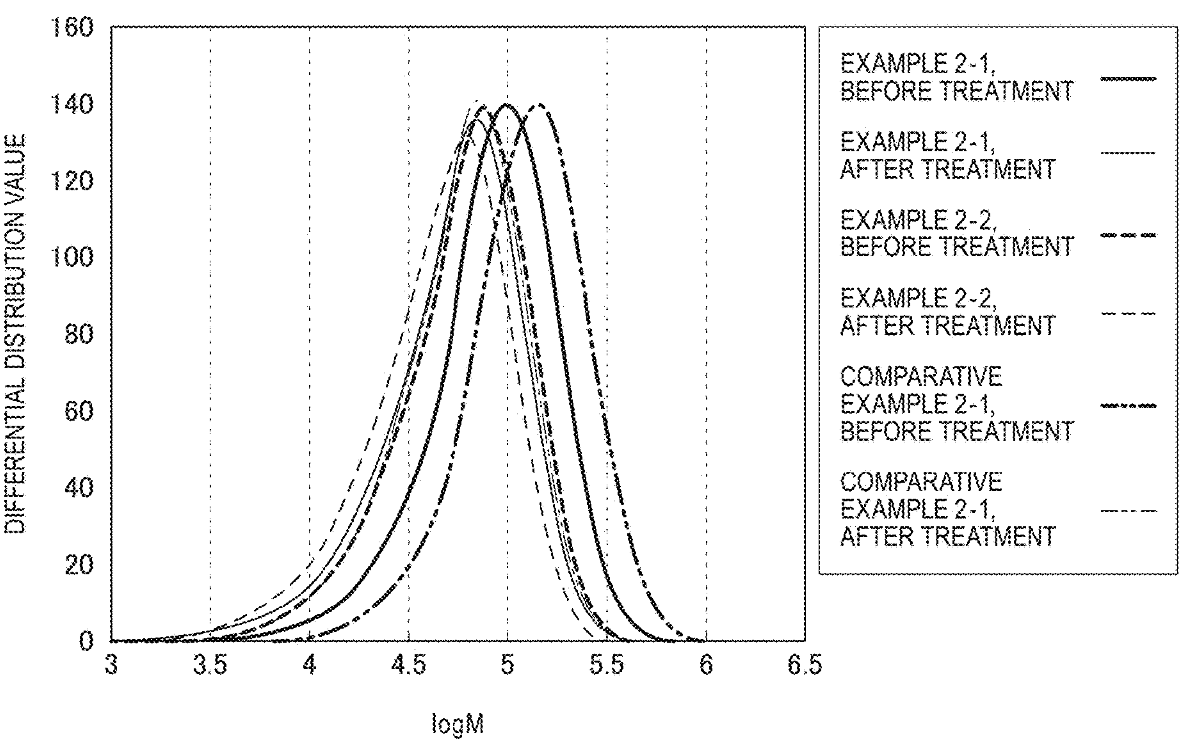
FIG. 8 is a graph illustrating the molecular weight measurement results of biodegradable resin compositions in the test pieces before and after the accelerated degradation test in Example 2.
Figure 9A:
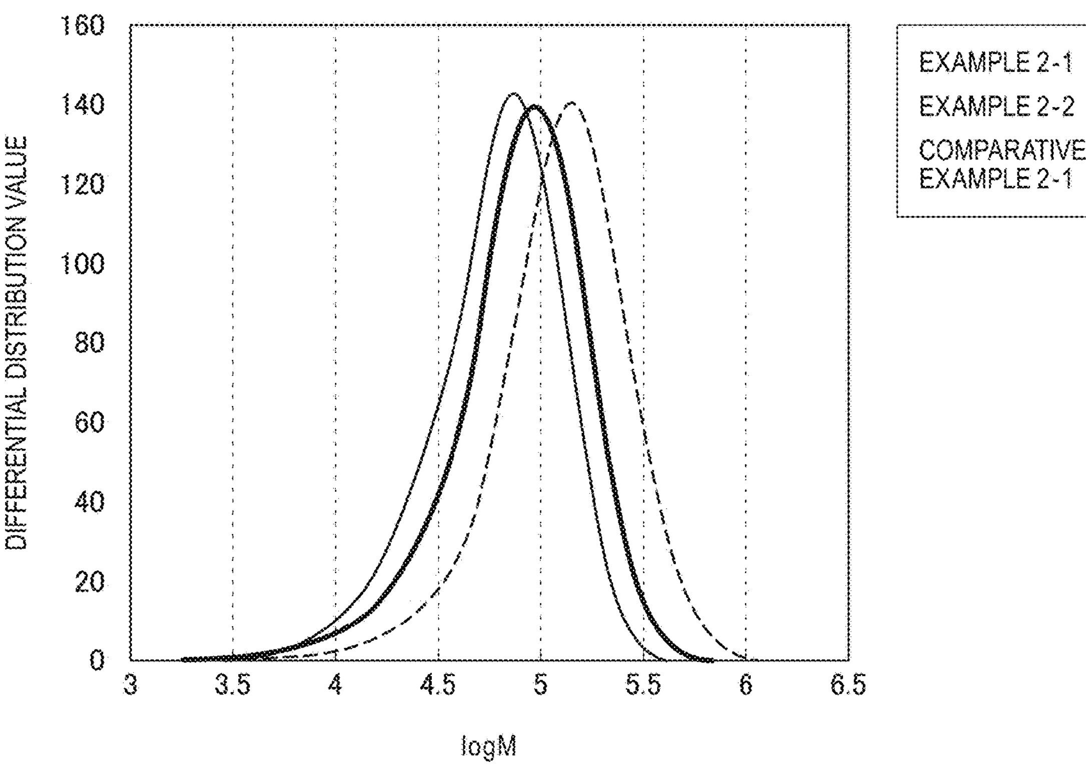
FIG. 9A is a graph illustrating the molecular weight measurement results before the weathering test in Example 2.
Figure 9B:
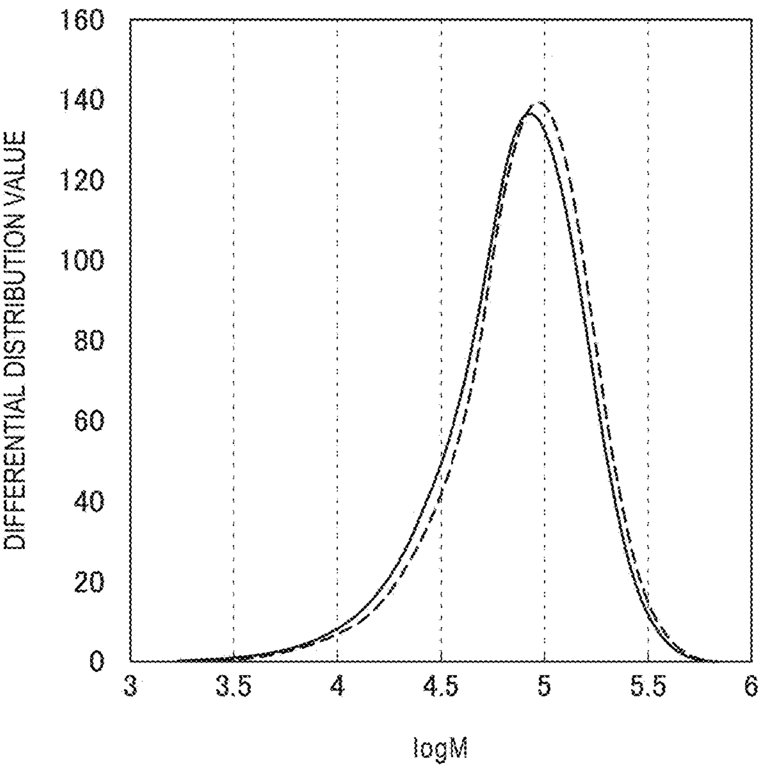
FIG. 9B is a graph illustrating the molecular weight measurement results before and after the weathering test in Example 2-1.
Figure 9C:
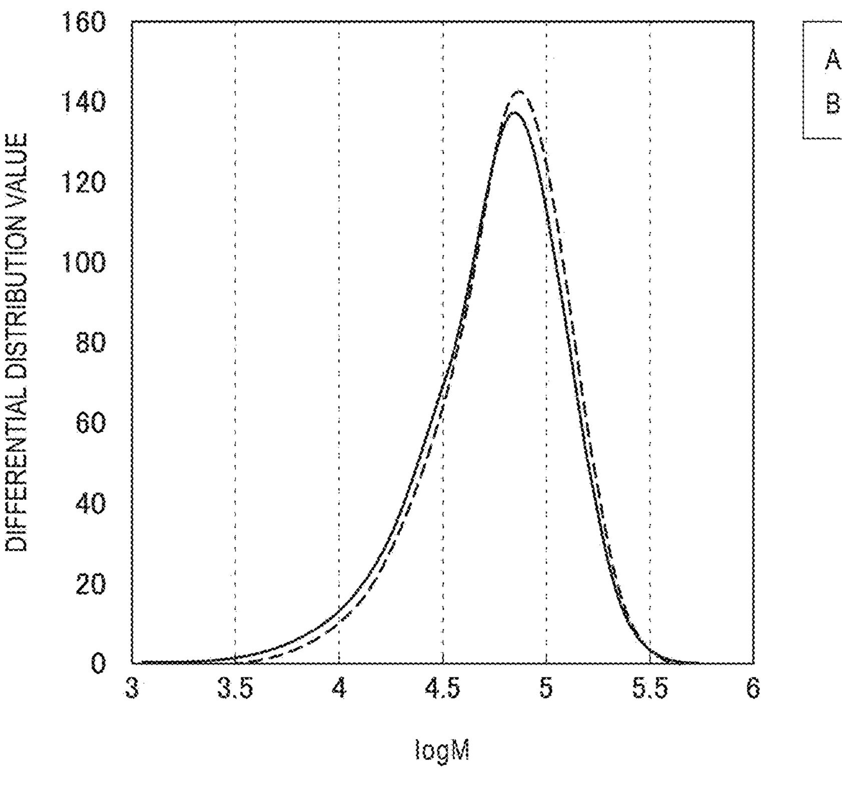
FIG. 9C is a graph illustrating the molecular weight measurement results before and after the weathering test in Example 2-2.
Figure 9D:
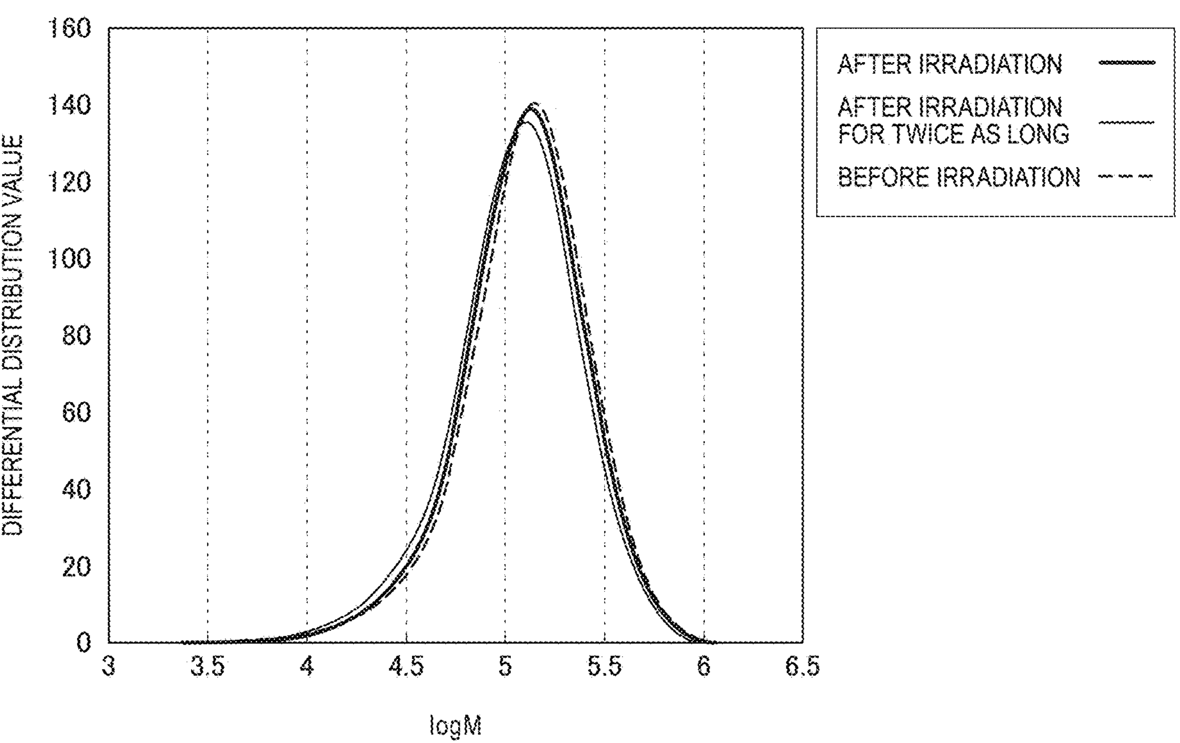
FIG. 9D is a graph illustrating the molecular weight measurement results before and after the weathering test in Comparative Example 2-1.

FIG. 3 is a graph illustrating the accelerated degradation test results, and FIG. 4 is a graph illustrating the weathering test results. FIG. 5A to FIG. 7C illustrate scanning electron microscope (SEM) images of the observed surfaces of the test pieces before the tests, after the accelerated degradation test, or after the weathering test. FIG. 5A, FIG. 5B, and FIG. 5C are surface SEM images of the test pieces formed from the biodegradable resin composition of Example 2-1, before the tests (FIG. 5A), after the accelerated degradation test (FIG. 5B), and after the weathering test (FIG. 5C). FIG. 6A, FIG. 6B, and FIG. 6C are surface SEM images of the test pieces formed from the biodegradable resin composition of Example 2-2, before the tests (FIG. 6A), after the accelerated degradation test (FIG. 6B). and after the weathering test (FIG. 6C). FIG. 7A, FIG. 7B, and FIG. 7C are surface SEM images of the test pieces formed from the biodegradable resin composition of Comparative Example 2-1, before the accelerated degradation test (FIG. 7A), after the accelerated degradation test (FIG. 7B), and after the weathering test (FIG. 7C). FIG. 8 is a graph illustrating the result of changes in molecular weight before and after the accelerated degradation test. FIG. 9A to FIG. 9D are graphs illustrating the results of changes in molecular weight before and after the weathering test. FIG. 9A is a graph illustrating the comparative result of the molecular weight measurement before the metal halide lamp irradiation in Examples and Comparative Example; FIG. 9B is a graph illustrating a change in molecular weight before and after the metal halide lamp irradiation in Example 2-1; FIG. 9C is a graph illustrating a change in molecular weight before and after the metal halide lamp irradiation in Example 2-2; and FIG. 9D is a graph illustrating a change in molecular weight before and after the metal halide lamp irradiation in Comparative Example 1-1.

than that of Comparative Example 2-1, in which no alginic acid mixture was added, and this reveals that the biodegrad-

TABLE 3

| | Bio-degrad-able resin | Biodegradation accelerator Material | Biodegradation accelerator Amount [% by mass] | Tensile test Film thick-ness [mm] | Tensile test Tensile force [N] | Tensile test Tensile force/film thickness [N/mm] | Accelerated degradation test Film thick-ness [mm] | Accelerated degradation test Tensile force [N] | Accelerated degradation test Tensile force/film thickness [N/mm] | Weathering test Film thick-ness [mm] | Weathering test Tensile force [N] | Weathering test Tensile force/film thickness [N/mm] |
|---|---|---|---|---|---|---|---|---|---|---|---|---|
| Ex. 2-1 | PLA | Alginic acid/laminarin/fucoidan/mannitol | 0.5 | 0.4 | 390.6 | 952.7 | 0.4 | 253.6 | 633.9 | 0.4 | 405.8 | 989.7 |
| Ex. 2-2 | PLA | Alginic acid/laminarin/fucoidan/mannitol | 1.0 | 0.3 | 245.6 | 767.6 | 0.4 | 101.1 | 240.7 | 0.3 | 275.8 | 862.0 |
| Comp. Ex. 2-1 | PLA | — | — | 0.4 | 438.5 | 1096.2 | 0.4 | 359.6 | 899.0 | 0.4 | 465.8 | 1194.5 |

TABLE 4

| | | Bio-degrad-able resin | Biodegradation accelerator Material | Biodegradation accelerator Amount [% by mass] | Number average molecular weight Mn | Weight average molecular weight Mw | Poly-dispersity Mw/Mn | Mn reduction rate | Mw reduction rate |
|---|---|---|---|---|---|---|---|---|---|
| Ex. 2-1 | Before treatment | PLA | Alginic acid/laminarin/fucoidan/mannitol | 0.5 | $6.10 \times 10^4$ | $11.00 \times 10^4$ | 1.80 | — | — |
| | After treatment | PLA | Alginic acid/laminarin/fucoidan/mannitol | 0.5 | $3.40 \times 10^4$ | $6.90 \times 10^4$ | 2.03 | 55.74 | 62.73 |
| Ex. 2-2 | Before treatment | PLA | Alginic acid/laminarin/fucoidan/mannitol | 1.0 | $4.20 \times 10^4$ | $7.70 \times 10^4$ | 1.83 | — | — |
| | After treatment | PLA | Alginic acid/laminarin/fucoidan/mannitol | 1.0 | $3.00 \times 10^4$ | $5.80 \times 10^4$ | 1.93 | 71.43 | 75.32 |
| Comp. Ex. 2-1 | Before treatment | PLA | — | — | $8.30 \times 10^4$ | $14.00 \times 10^4$ | 1.69 | — | — |
| | After treatment | PLA | — | — | $4.10 \times 10^4$ | $7.30 \times 10^4$ | 1.78 | 52.14 | 52.14 |

TABLE 5

| | | Bio-degrad-able resin | Biodegradation accelerator Material | Biodegradation accelerator Amount [% by mass] | Number average molecular weight Mn | Weight average molecular weight Mw | Poly-dispersity Mw/Mn | Mn reduction rate | Mw reduction rate |
|---|---|---|---|---|---|---|---|---|---|
| Ex. 2-1 | Before irradiation | PLA | Alginic acid/laminarin/fucoidan/mannitol | 0.5 | $5.60 \times 10^4$ | $10.00 \times 10^4$ | 1.79 | — | — |
| | After irradiation | PLA | Alginic acid/laminarin/fucoidan/mannitol | 0.5 | $5.00 \times 10^4$ | $9.20 \times 10^4$ | 1.84 | 89.29 | 92.00 |
| Ex. 2-2 | Before irradiation | PLA | Alginic acid/laminarin/fucoidan/mannitol | 1.0 | $4.50 \times 10^4$ | $7.60 \times 10^4$ | 1.69 | — | — |
| | After irradiation | PLA | Alginic acid/laminarin/fucoidan/mannitol | 1.0 | $3.90 \times 10^4$ | $7.20 \times 10^4$ | 1.85 | 86.67 | 94.74 |
| Comp. Ex. 2-1 | Before irradiation | PLA | — | — | $9.10 \times 10^4$ | $16.00 \times 10^4$ | 1.76 | — | — |
| | After irradiation | PLA | — | — | $9.10 \times 10^4$ | $15.00 \times 10^4$ | 1.65 | 93.75 | 93.75 |

As shown in Table 3, FIG. 3, and FIG. 4, the test pieces formed from the biodegradable resin compositions of Examples and Comparative Example had higher breaking strengths after the metal halide lamp irradiation. This is probably because metal halide lamp irradiation crystallizes polylactic acid to increase the strength. The test pieces formed from the biodegradable resin compositions of Example 2-1 and Example 2-2, in which the alginic acid mixture was added, however, had lower breaking strengths able resin more easily degrades. The test piece formed from the biodegradable resin composition of Example 2-2 had a larger decrease in breaking strength after the metal halide lamp irradiation and had a larger reduction rate of breaking strength than the test pieces formed from the biodegradable resin compositions of Example 2-1 and Comparative Example 2-1, and this reveals that as the alginic acid mixture is added in a larger amount, the biodegradable resin more easily degrades.

As illustrated in FIG. 5A, FIG. 5B, FIG. 6A, and FIG. 6B, in the test pieces formed from the biodegradable resin compositions of Example 2-1 and Example 2-2, in which the alginic acid mixture was added, pores (the dotted line region illustrated in FIG. 5B and the dot-dash line region illustrated in FIG. 6B) or hollows (the broken line region illustrated in FIG. 6B) were formed after the accelerated degradation test, or the test pieces were ascertained to decompose. Such well-shaped, large pores formed in the test piece after the accelerated degradation test (see FIG. 5B) or well-shaped, small pores or hollows distributed in the test piece (see FIG. 6B) are thought to be formed by the alginic acid mixture.

In contrast, in the test piece formed from the biodegradable resin composition of Comparative Example 2-1, in which no alginic acid mixture was added, illustrated in FIG. 7A and FIG. 7B, neither well-shaped, large pores nor well-shaped, small pores or hollows distributed in the test piece were observed unlike the test pieces of Example 2-1 and Example 2-2.

As illustrated in FIG. 5A, FIG. 5C, FIG. 6A, and FIG. 6C, in the test pieces formed from the biodegradable resin compositions of Example 2-1 and Example 2-2, in which the alginic acid mixture was added, pores were formed after the weathering test, or the test pieces were ascertained to decompose. Such pores are thought to be formed by the alginic acid mixture.

In contrast, in the test piece formed from the biodegradable resin composition of Comparative Example 2-1, in which no alginic acid mixture was added, illustrated in FIG. 7A and FIG. 7C, small pores having varying shapes (pores formed by decomposition of the resin) were observed over the surface, but large pores, which were observed in the test pieces of Example 2-1 and Example 2-2, were not observed.

FIG. 8 is a graph illustrating the molecular weight measurement results of the biodegradable resin compositions in the test pieces of Examples and Comparative Example before and after the accelerated degradation test.

As shown in FIG. 8 and Table 4, before the accelerated degradation test, the test pieces formed from the biodegradable resin compositions of Example 2-1 and Example 2-2, in which the alginic acid mixture was added, had peak tops that were shifted to the left in the graph and had lower molecular weights as compared with the test piece formed from the biodegradable resin composition of Comparative Example 2-1, in which no alginic acid mixture was added. As illustrated in FIG. 8, the test pieces formed from the biodegradable resin compositions of Example 2-1 and Example 2-2 had lower molecular weights after the accelerated degradation test.

FIG. 9A to FIG. 9D are graphs illustrating the molecular weight measurement results of the biodegradable resin compositions in the test pieces of Examples and Comparative Example before and after the weathering test. FIG. 9A is a graph illustrating the molecular weights of the biodegradable resin compositions in the test pieces of Example 2-1, Example 2-2, and Comparative Example 2-1 before the metal halide lamp irradiation. FIG. 9B is a graph illustrating the molecular weights of the biodegradable resin composition in the test piece before and after the metal halide lamp irradiation in Example 2-1; FIG. 9C is a graph illustrating the molecular weights of the biodegradable resin composition in the test piece before and after the metal halide lamp irradiation in Example 2-2; and FIG. 9D is a graph illustrating the molecular weights of the biodegradable resin composition in the test piece before and after the metal halide lamp irradiation in Comparative Example 2-1.

As shown in FIG. 9A and Table 5, before the metal halide lamp irradiation (weathering test), the test pieces formed from the biodegradable resin compositions of Example 2-1 and Example 2-2, in which the alginic acid mixture was added, had peak tops that were shifted to the left in the graph and had lower molecular weights as compared with the test piece formed from the biodegradable resin composition of Comparative Example 2-1, in which no alginic acid mixture was added.

As shown in FIG. 9B, FIG. 9C, and Table 5, the test pieces formed from the biodegradable resin compositions of Example 2-1 and Example 2-2 had lower molecular weights after the metal halide lamp irradiation, and the molecular weight particularly decreased in the test piece formed from the biodegradable resin composition of Example 2-2. The molecular weight in Example 2-2 much more decreased than that in Comparative Example 2-1 shown in FIG. 9D and Table 5 at the same irradiation time and decreased to substantially the same degree as when the irradiation time was twice.

The above results reveal that as the alginic acid mixture is added in a larger amount, the breaking strength is further lowered, or the biodegradable resin more easily degrades.

Example 3

Biodegradable resin compositions were prepared while the additive added to a biodegradable resin was changed, and the tensile strength of each test piece formed from the biodegradable resin compositions was determined.

Example 3-1

To PLA (polylactic acid) as a biodegradable resin, the alginic acid mixture and titanium oxide (rutile-type) as a photocatalyst were added, and a biodegradable resin composition of Example 3-1 was prepared. The biodegradable resin composition contained the alginic acid mixture in an amount of 0.5% by mass, and the biodegradable resin composition contained titanium oxide in an amount of 3.0% by mass. Such a biodegradable resin composition was subjected to extrusion molding to form a resin film having a film thickness of 0.4 mm as a test piece of Example 3-1.

Example 3-2

Substantially the same procedure as in Example 3-1 was performed except that the resin film had a film thickness of 0.2 mm, and a test piece was prepared from the biodegradable resin composition of Example 3-2.

Example 3-3

Substantially the same procedure as in Example 3-2 was performed except that alginic acid was added as the additive, and a test piece was prepared from the biodegradable resin composition of Example 3-3.

Example 3-4

Substantially the same procedure as in Example 3-2 was performed except that sodium alginate was added as the additive, and a test piece was prepared from the biodegradable resin composition of Example 3-4.

Comparative Example 3-1

Substantially the same procedure as in Example 3-1 was performed except that no additive was added, and a test piece was prepared from the biodegradable resin composition of Comparative Example 3-1.

Comparative Example 3-2

Substantially the same procedure as in Example 3-2 was performed except that no additive was added, and a test piece was prepared from the biodegradable resin composition of Comparative Example 3-2.

[Evaluation]

(Tensile Test)

As with Example 1, the test pieces formed from the biodegradable resin compositions described in Examples and Comparative Examples were subjected to tensile test, and the average tensile forces at break were determined.

(Weathering Test)

As with Example 2, the test pieces formed from the biodegradable resin compositions described in Examples and Comparative Examples were subjected to metal halide lamp irradiation and then were subjected to tensile test, and the average tensile forces at break were determined.

(Molecular Weight Measurement)

As with Example 2, changes in molecular weight of the test pieces formed from the biodegradable resin compositions described in Examples and Comparative Examples were determined before and after the accelerated degradation test (storage in a constant temperature and humidity chamber) and before and after the weathering test (metal halide lamp irradiation).

Figure 10A:
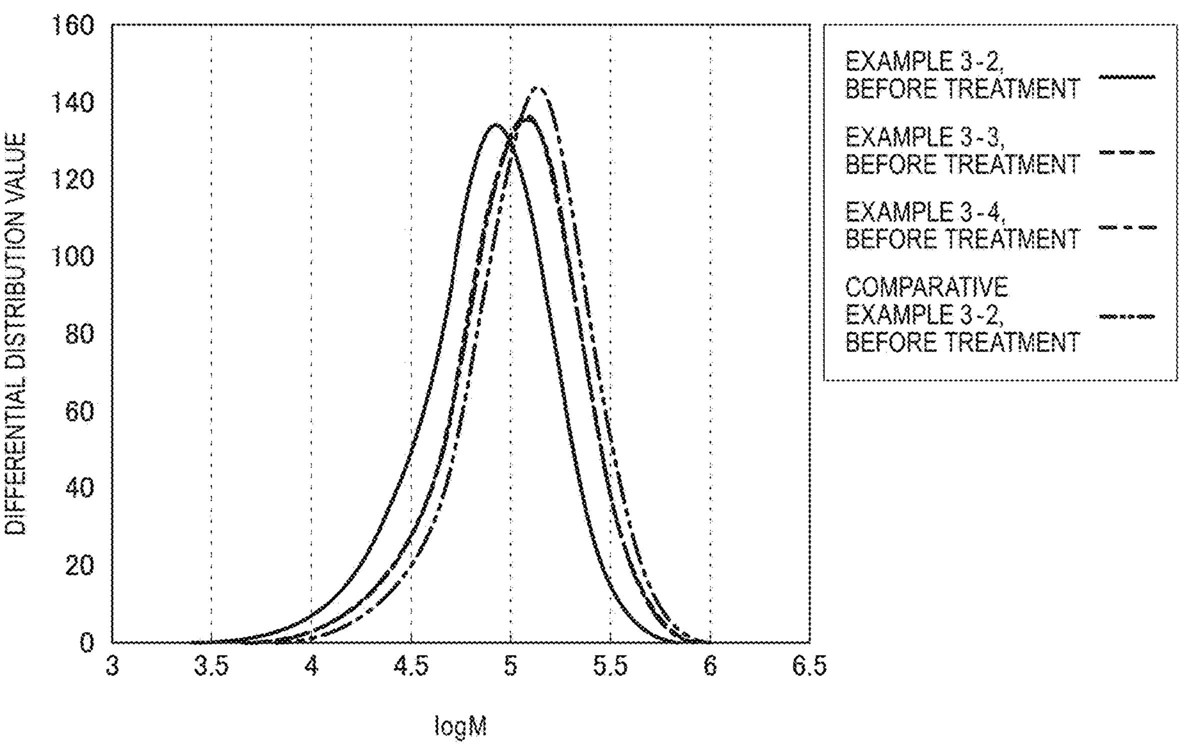
FIG. 10A is a graph illustrating the molecular weight measurement results before the weathering test in Example 3.
Figure 10B:
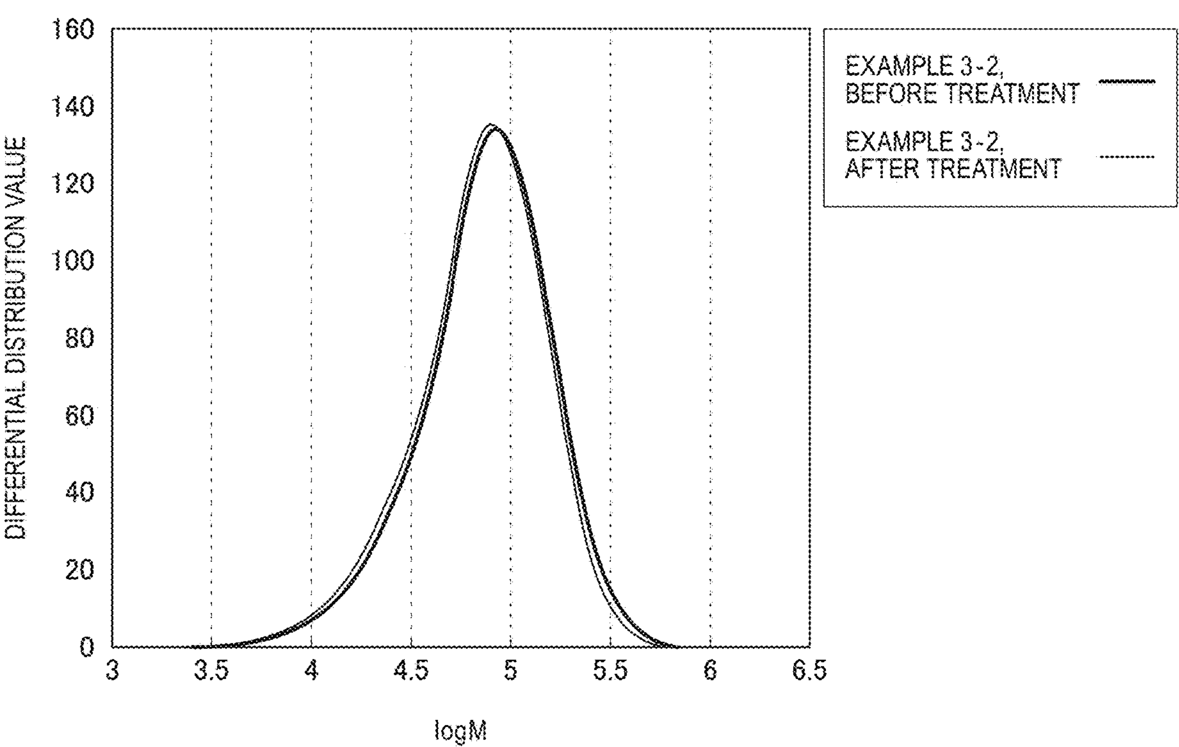
FIG. 10B is a graph illustrating the molecular weight measurement results before and after the weathering test in Example 3-2.
Figure 10C:
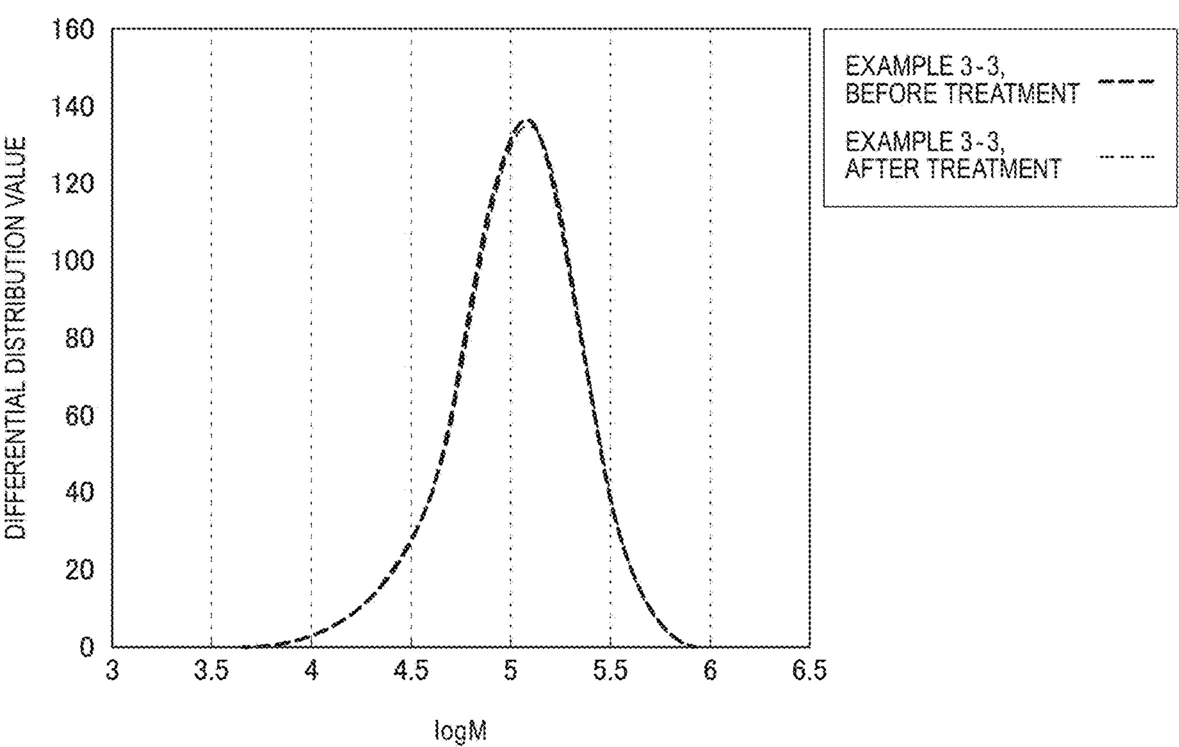
FIG. 10C is a graph illustrating the molecular weight measurement results before and after the weathering test in Example 3-3.
Figure 10D:
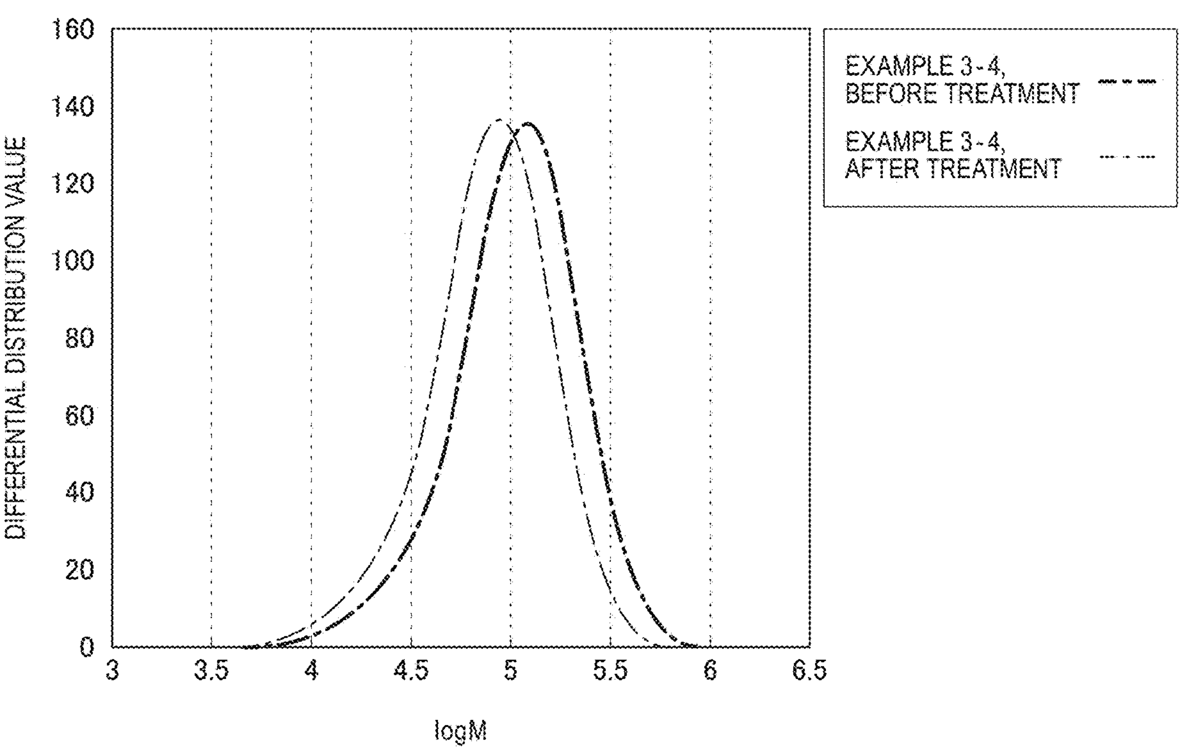
FIG. 10D is a graph illustrating the molecular weight measurement results before and after the weathering test in Example 3-4.
Figure 10E:
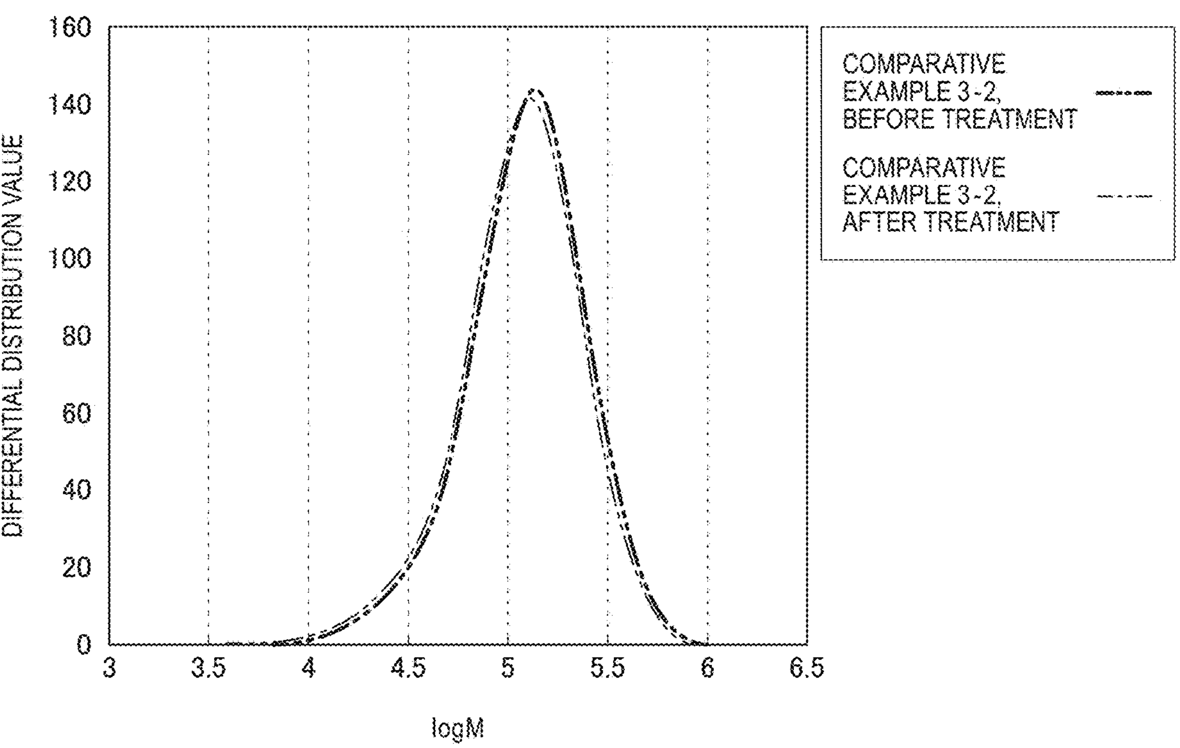
FIG. 10E is a graph illustrating the molecular weight measurement results before and after the weathering test in Comparative Example 3-2.
Figure 11A:
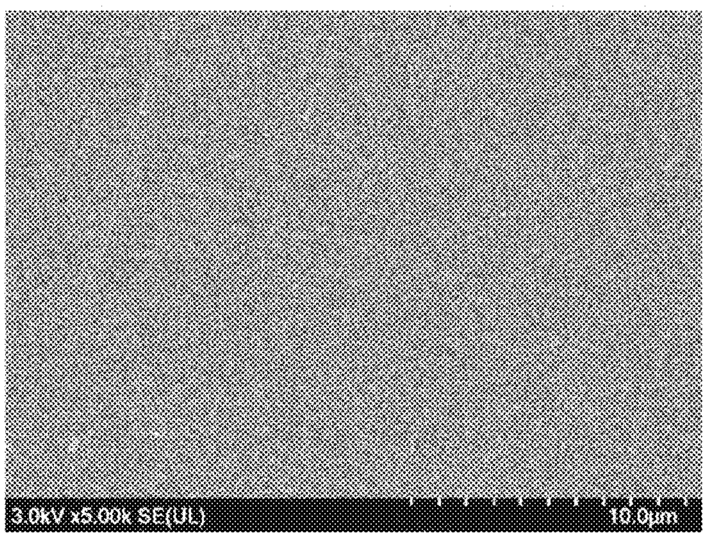
FIG. 11A is a scanning electron microscope image of the observed surface of the test piece before the weathering test in Example 3-2.
Figure 11B:
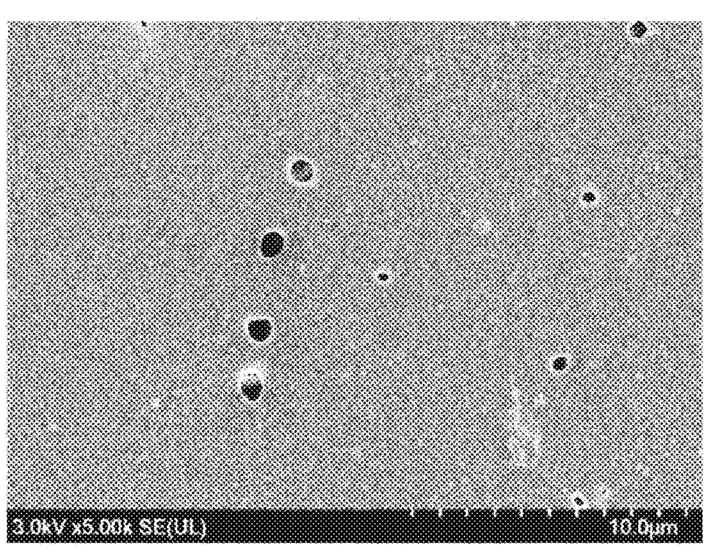
FIG. 11B is a scanning electron microscope image of the observed surface of the test piece after the weathering test in Example 3-2.
Figure 12A:
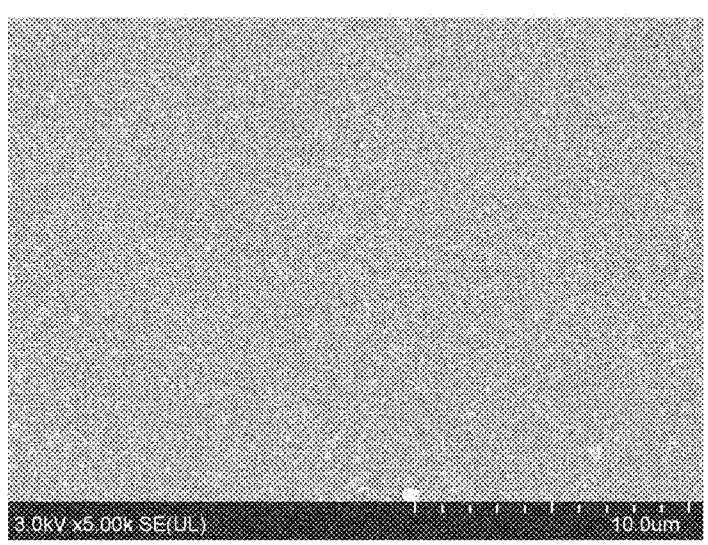
FIG. 12A is a scanning electron microscope image of the observed surface of the test piece before the weathering test in Example 3-3.
Figure 12B:
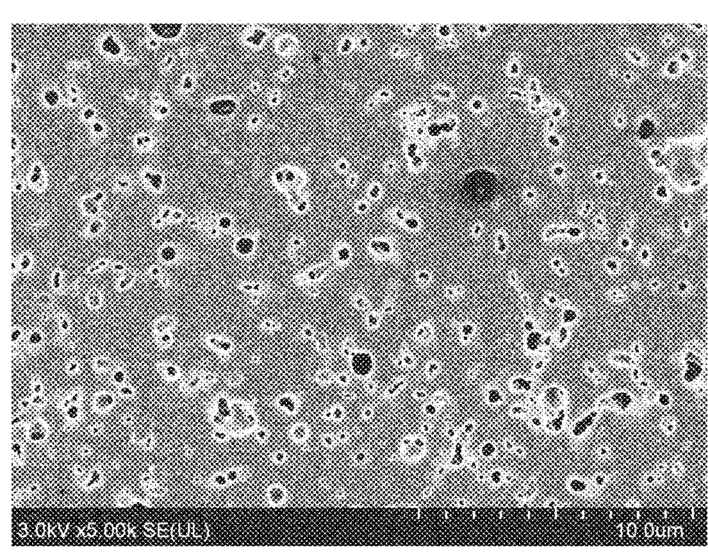
FIG. 12B is a scanning electron microscope image of the observed surface of the test piece after the weathering test in Example 3-3.
Figure 13A:
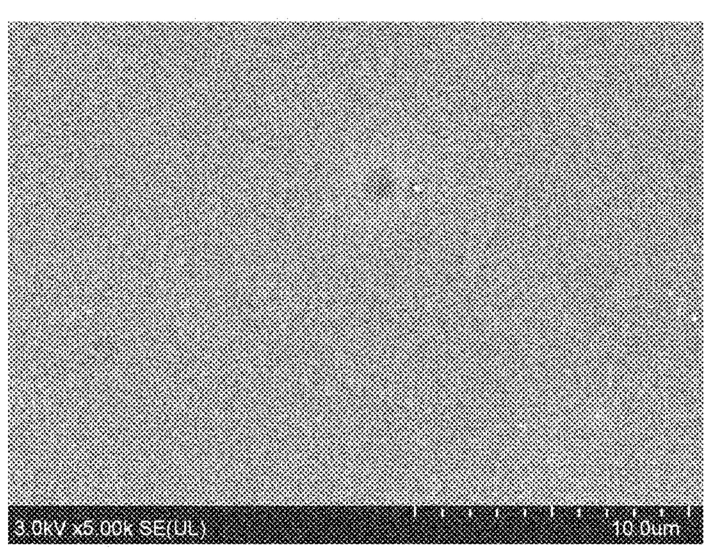
FIG. 13A is a scanning electron microscope image of the observed surface of the test piece before the weathering test in Example 3-4.
Figure 13B:
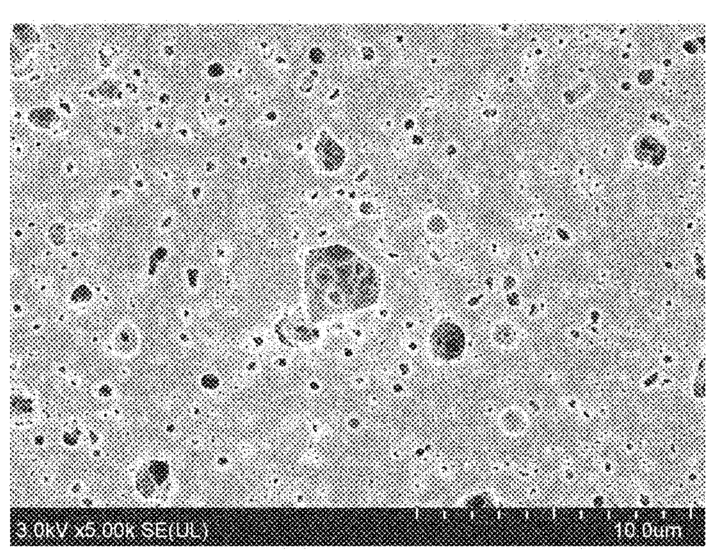
FIG. 13B is a scanning electron microscope image of the observed surface of the test piece after the weathering test in Example 3-4.

Table 6 shows the evaluation results of tensile force at break to film thickness of the test pieces in Examples and Comparative Examples before and after the weathering test. Table 7 shows the evaluation results of molecular weights of the test pieces in Examples and Comparative Examples before and after the weathering test. FIG. 10A is a graph illustrating the comparative result of the molecular weight measurement of the test pieces in Examples and Comparative Examples before the metal halide lamp irradiation; FIG. 10B is a graph illustrating a change in molecular weight before and after the metal halide lamp irradiation in Example 3-2; FIG. 10C is a graph illustrating a change in molecular weight before and after the metal halide lamp irradiation in Example 3-3; FIG. 10D is a graph illustrating a change in molecular weight before and after the metal halide lamp irradiation in Example 3-4; and FIG. 10E is a graph illustrating a change in molecular weight before and after the metal halide lamp irradiation in Comparative Example 3-2. FIG. 11A and FIG. 11B illustrate surface SEM images of the test pieces in Example 3-2 before and after the weathering test; FIG. 12A and FIG. 12B illustrate surface SEM images of the test pieces in Example 3-3 before and after the weathering test; and FIG. 13A and FIG. 13B illustrate surface SEM images of the test pieces in Example 3-4 before and after the weathering test.

TABLE 6

| | Biodegradable resin | Biodegradation accelerator | | Photocatalytic additive | | Tensile test | | | Weathering test | | |
|---|---|---|---|---|---|---|---|---|---|---|---|
| | | Material | Amount [% by mass] | Material | Amount [% by mass] | Film thickness [mm] | Tensile force [N] | Tensile force/film thickness [N/mm] | Film thickness [mm] | Tensile force [N] | Tensile force/film thickness [N/mm] |
| Ex. 3-1 | PLA | Alginic acid/laminarin/fucoidan/mannitol | 0.5 | Titanium oxide | 3.0 | 0.4 | 480.1 | 1200.2 | 0.4 | 348.2 | 870.5 |
| Ex. 3-2 | PLA | Alginic acid/laminarin/fucoidan/mannitol | 0.5 | Titanium oxide | 3.0 | 0.2 | 171.0 | 890.8 | 0.2 | 138.6 | 721.7 |
| Ex. 3-3 | PLA | Alginic acid | 0.5 | Titanium oxide | 3.0 | 0.2 | 197.9 | 989.5 | 0.2 | 198.1 | 990.7 |
| Ex. 3-4 | PLA | Sodium alginate | 0.5 | Titanium oxide | 3.0 | 0.2 | 201.9 | 917.6 | 0.2 | 191.0 | 830.6 |
| Comp. Ex. 3-1 | PLA | — | — | Titanium oxide | 3.0 | 0.4 | 434.7 | 1060.3 | 0.4 | 405.8 | 989.9 |
| Comp. Ex. 3-2 | PLA | — | — | Titanium oxide | 3.0 | 0.2 | 170.6 | 1003.3 | 0.2 | 156.0 | 866.7 |

TABLE 7

| | | Biodegradable resin | Biodegradation accelerator | | Photocatalytic additive | | Number average molecular weight Mn | Weight average molecular weight Mw | Polydispersity Mw/Mn | Mn reduction rate | Mw reduction rate |
|---|---|---|---|---|---|---|---|---|---|---|---|
| | | | Material | Amount [% by mass] | Material | Amount [% by mass] | | | | | |
| Ex. 3-2 | Before irradiation | PLA | Alginic acid/laminarin/fucoidan/mannitol | 0.5 | Titanium oxide | 3.0 | $5.30 \times 10^4$ | $9.60 \times 10^4$ | 1.81 | — | — |
| | After irradiation | PLA | Alginic acid/laminarin/fucoidan/mannitol | 0.5 | Titanium oxide | 3.0 | $5.10 \times 10^4$ | $8.90 \times 10^4$ | 1.75 | 96.23 | 92.71 |
| Ex. 3-3 | Before irradiation | PLA | Alginic acid | 0.5 | Titanium oxide | 3.0 | $7.80 \times 10^4$ | $13.00 \times 10^4$ | 1.67 | — | — |
| | After irradiation | PLA | Alginic acid | 0.5 | Titanium oxide | 3.0 | $7.00 \times 10^4$ | $12.00 \times 10^4$ | 1.71 | 89.74 | 92.31 |

TABLE 7-continued

| | | Bio-degradable resin | Biodegradation accelerator Material | Amount [% by mass] | Photocatalytic additive Material | Amount [% by mass] | Number average molecular weight Mn | Weight average molecular weight Mw | Poly-dispersity Mw/Mn | Mn reduction rate | Mw reduction rate |
|---|---|---|---|---|---|---|---|---|---|---|---|
| Ex. 3-4 | Before irradiation | PLA | Sodium alginate | 0.5 | Titanium oxide | 3.0 | $7.60 \times 10^4$ | $13.00 \times 10^4$ | 1.71 | — | — |
| | After irradiation | PLA | Sodium alginate | 0.5 | Titanium oxide | 3.0 | $7.20 \times 10^4$ | $12.00 \times 10^4$ | 1.67 | 94.74 | 92.31 |
| Comp. Ex. 3-2 | Before irradiation | PLA | — | — | Titanium oxide | 3.0 | $9.30 \times 10^4$ | $15.00 \times 10^4$ | 1.61 | — | — |
| | After irradiation | PLA | — | — | Titanium oxide | 3.0 | $8.50 \times 10^4$ | $14.00 \times 10^4$ | 1.65 | 91.40 | 93.33 |

As shown in Table 6, the test piece formed from the biodegradable resin composition of Example 3-1, in which the alginic acid mixture and titanium oxide were added to the biodegradable resin, had a higher breaking strength in the tensile test than the test piece formed from the biodegradable resin composition of Comparative Example 3-1, in which the film thickness was the same (0.4 mm), and no alginic acid was added, but had a lower breaking strength in the weathering test than the test piece formed from the biodegradable resin composition of Comparative Example 3-1. Similarly, the test piece formed from the biodegradable resin composition of Example 3-2, in which alginic acid and titanium oxide were added to the biodegradable resin, had substantially the same breaking strength in the tensile test as that of the test piece formed from the biodegradable resin composition of Comparative Example 3-2, in which the film thickness was the same (0.2 mm), and no alginic acid was added, and had a lower breaking strength after the weathering test. In other words, the resin products had high strength at the early stage of formation (when used) but were then rapidly decomposed by hydrolysis to promote microbial degradation. A test piece having a smaller film thickness was more easily decomposed by hydrolysis.

In particular, the test piece formed from the biodegradable resin composition of Example 3-4, in which sodium alginate and titanium oxide were added to the biodegradable resin, had a markedly low breaking strength in the tensile test.

As shown in FIG. 10A and Table 7, before the metal halide lamp irradiation, the test pieces formed from the biodegradable resin compositions of Example 3-2 to Example 3-4, in which the alginic acid mixture, alginic acid, or sodium alginate was added, had peak tops that were shifted to the left in the graph and had lower molecular weights as compared with the test piece formed from the biodegradable resin composition of Comparative Example 3-2, in which no biodegradable accelerator was added. In particular, the biodegradable resin containing the alginic acid mixture in Example 3-2 had a particularly small molecular weight, and the biodegradable resin was ascertained to be easily degraded.

As shown in FIG. 10B to FIG. 10D and Table 7, the test pieces formed from the biodegradable resin compositions of Example 3-2 to Example 3-4 tended to have a lower molecular weight after the metal halide lamp irradiation. In particular, the molecular weight of the test piece formed from the biodegradable resin composition of Example 3-4, in which sodium alginate and titanium oxide were added, was greatly reduced.

The above results reveals that the resin product of the biodegradable resin composition containing titanium oxide has high strength at the early stage of formation (when used), and then the biodegradable resin is easily degraded by decomposition effect of the hydrolysis accelerator (especially sodium alginate).

As illustrated in FIG. 11A to FIG. 13B, the test pieces containing the hydrolysis accelerator and titanium oxide had pores in the test piece after the weathering test, and the test pieces were ascertained to decompose.

Example 4

Biodegradable resin compositions were prepared while the alginic acid mixture and titanium oxide were added to the biodegradable resin, and the amount of the alginic acid mixture was changed, and the tensile strengths of the test pieces formed from the biodegradable resin compositions and having different film thicknesses were determined.

Example 4-1

Substantially the same procedure as in Example 3-1 was performed while the amount of the alginic acid mixture was 0.5% by mass, and the amount of titanium oxide was 3.0% by mass, and a biodegradable resin composition of Example 4-1 was prepared. Such a biodegradable resin composition was subjected to extrusion molding to form a resin film having a film thickness of 0.4 mm as a test piece of Example 4-1.

Example 4-2

Substantially the same procedure as for the biodegradable resin composition in Example 4-1 was performed except that the amount of the alginic acid mixture was 1.0% by mass, and a biodegradable resin composition of Example 4-2 was prepared. Such a biodegradable resin composition was subjected to extrusion molding to form a resin film having a film thickness of 0.5 mm as a test piece of Example 4-2.

Example 4-3

Substantially the same procedure as in Example 4-1 was performed except that the resin film had a film thickness of 0.2 mm, and a test piece was prepared from the biodegradable resin composition of Example 4-3.

Example 4-4

Substantially the same procedure as in Example 4-2 was performed except that the resin film had a film thickness of 0.2 mm, and a test piece was prepared from the biodegradable resin composition of Example 4-4.

Comparative Example 4-1

Substantially the same procedure as for the biodegradable resin composition in Example 4-1 was performed except that no alginic acid mixture was added, and a biodegradable resin composition of Comparative Example 4-1 was prepared.

Comparative Example 4-2

Substantially the same procedure as in Comparative Example 4-1 was performed except that the resin film had a film thickness of 0.2 mm, and a test piece was prepared from the biodegradable resin composition of Comparative Example 4-2.

[Evaluation]

(Tensile Test)

As with Example 1, the test pieces formed from the biodegradable resin compositions described in Examples and Comparative Examples were subjected to tensile test, and the average tensile forces at break were determined.

(Weathering Test)

As with Example 2, the test pieces formed from the biodegradable resin compositions described in Examples and Comparative Examples were subjected to metal halide lamp irradiation and then were subjected to tensile test, and the average tensile forces at break were determined.

(Molecular Weight Measurement)

As with Example 2, changes in molecular weight of the test pieces formed from the biodegradable resin compositions described in Examples and Comparative Examples were determined before and after the weathering test (metal halide lamp irradiation).

Figure 14:
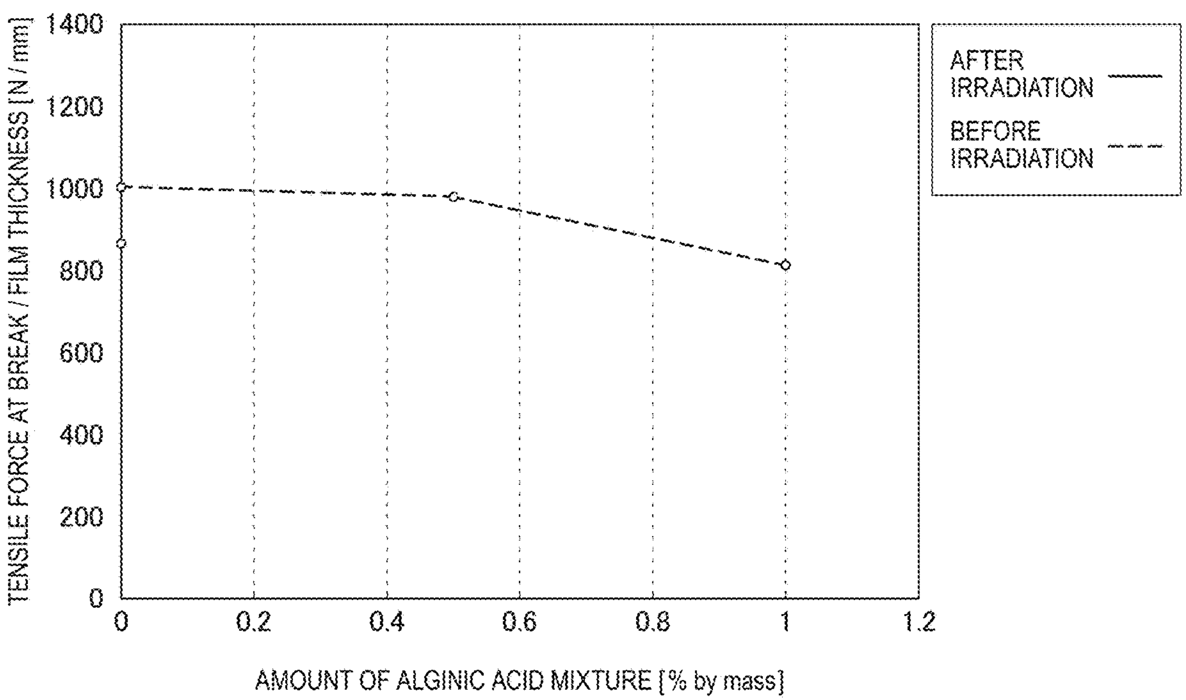
FIG. 14 is a graph illustrating the test results before and after the weathering test in Example 4-3, Example 4-4, and Comparative Example 4-1.
Figure 15A:
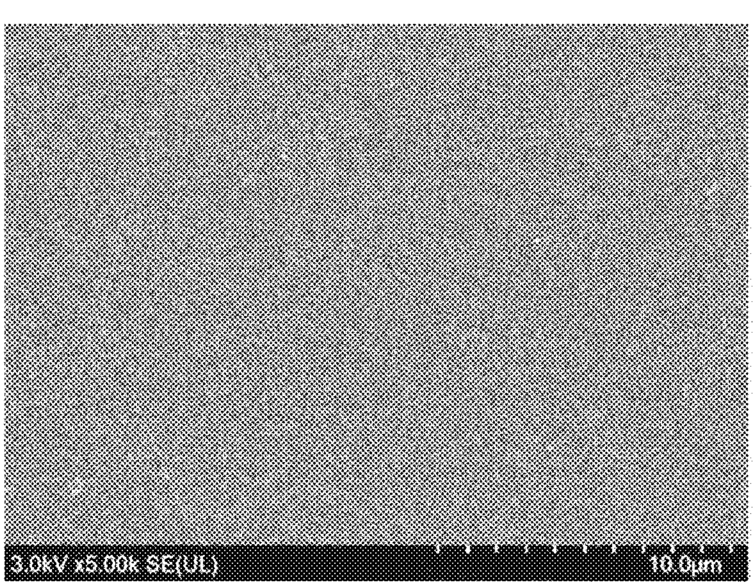
FIG. 15A is a scanning electron microscope image of the observed surface of the test piece before the weathering test in Example 4-3.
Figure 15B:
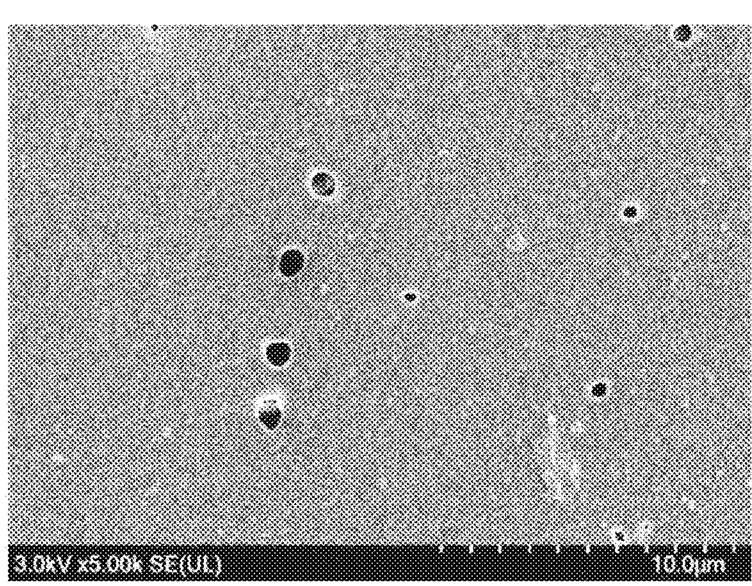
FIG. 15B is a scanning electron microscope image of the observed surface of the test piece after the weathering test in Example 4-3.
Figure 16A:
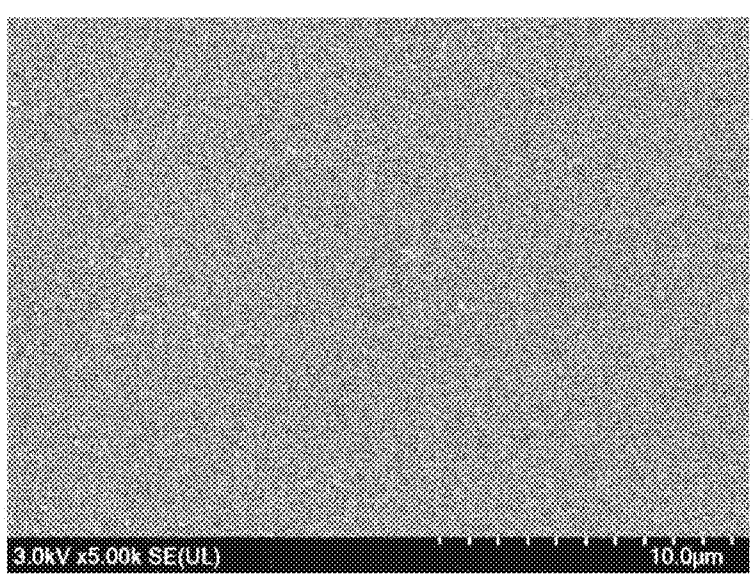
FIG. 16A is a scanning electron microscope image of the observed surface of the test piece before the weathering test in Example 4-4.
Figure 16B:
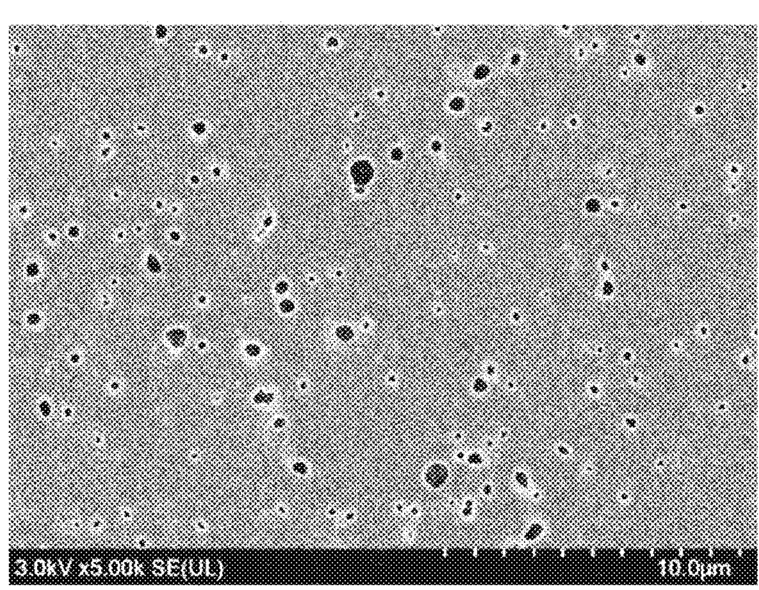
FIG. 16B is a scanning electron microscope image of the observed surface of the test piece after the weathering test in Example 4-4.
Figure 17:
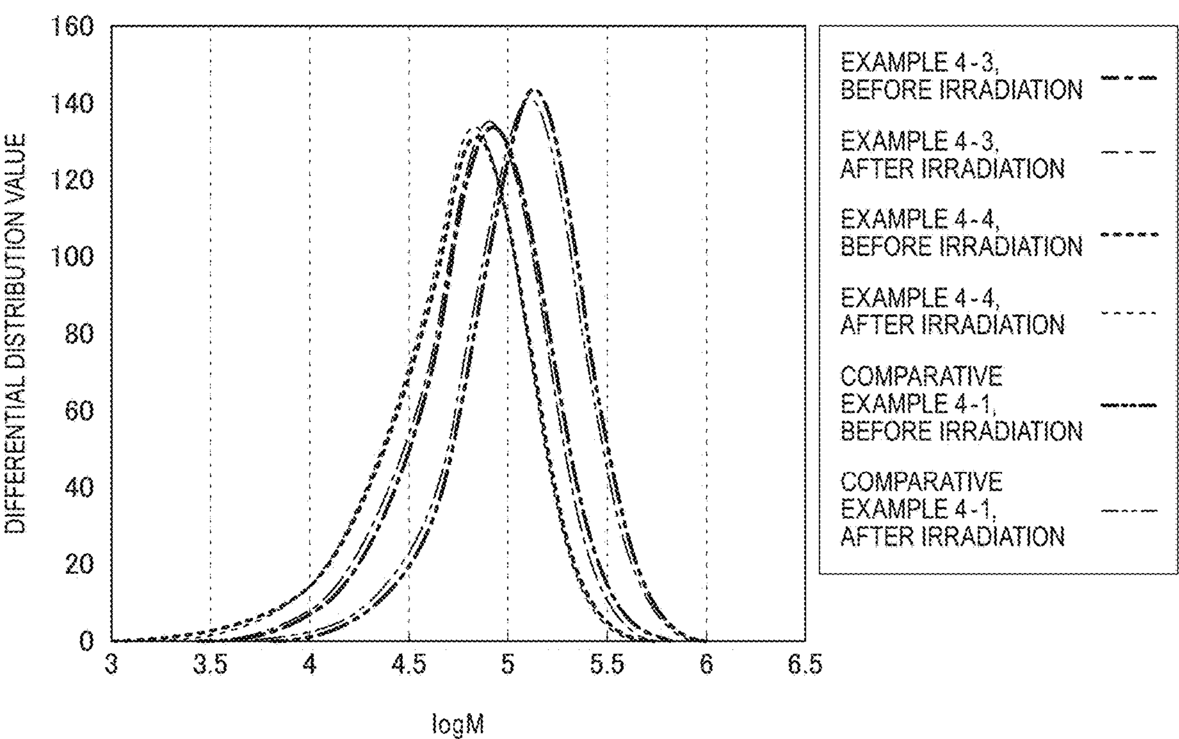
FIG. 17 is a graph illustrating the molecular weight measurement results before and after the weathering test in Example 4.

Table 8 shows the evaluation results of tensile force at break to film thickness of the test pieces in Examples and Comparative Examples before and after the weathering test. Table 9 shows the evaluation results of molecular weights of the test pieces in Examples and Comparative Examples before and after the weathering test. FIG. 14 is a graph illustrating the test results of tensile force at break to film thickness of the test pieces in Example 4-3, Example 4-4, and Comparative Example 4-1 before and after the weathering test. FIG. 15A and FIG. 15B illustrate surface SEM images of the test pieces in Example 4-3 before and after the weathering test; and FIG. 16A and FIG. 16B illustrate surface SEM images of the test pieces in Example 4-4 before and after the weathering test. FIG. 17 is a graph illustrating changes in molecular weight before and after the metal halide lamp irradiation in Example 4-3, Example 4-4, and Comparative Example 4-1.

TABLE 8

| | Biodegradable resin | Biodegradation accelerator | | Photocatalytic additive | | Tensile test | | | Weathering test | | |
|---|---|---|---|---|---|---|---|---|---|---|---|
| | | Material | Amount [% by mass] | Material | Amount [% by mass] | Film thickness [mm] | Tensile force [N] | Tensile force/film thickness [N/mm] | Film thickness [mm] | Tensile force [N] | Tensile force/film thickness [N/mm] |
| Ex. 4-1 | PLA | Alginic acid/laminarin/fucoidan/mannitol | 0.5 | Titanium oxide | 3.0 | 0.4 | 480.1 | 1200.2 | 0.4 | 348.2 | 870.5 |
| Ex. 4-2 | PLA | Alginic acid/laminarin/fucoidan/mannitol | 1.0 | Titanium oxide | 3.0 | 0.5 | 381.8 | 830.0 | 0.5 | 303.3 | 659.4 |
| Ex. 4-3 | PLA | Alginic acid/laminarin/fucoidan/mannitol | 0.5 | Titanium oxide | 3.0 | 0.2 | 184.3 | 980.2 | 0.2 | Unmeasurable | Unmeasurable |
| Ex. 4-4 | PLA | Alginic acid/laminarin/fucoidan/mannitol | 1.0 | Titanium oxide | 3.0 | 0.2 | 141.6 | 813.6 | 0.2 | Unmeasurable | Unmeasurable |
| Comp. Ex. 4-1 | PLA | — | — | Titanium oxide | 3.0 | 0.4 | 434.7 | 1060.3 | 0.4 | 405.8 | 989.9 |
| Comp. Ex. 4-2 | PLA | — | — | Titanium oxide | 3.0 | 0.2 | 170.6 | 1003.3 | 0.2 | 156 | 866.7 |

TABLE 9

| | | Biodegradable resin | Biodegradation accelerator | | Photocatalytic additive | | Number average molecular weight Mn | Weight average molecular weight Mw | Polydispersity Mw/Mn | Mn reduction rate | Mw reduction rate |
|---|---|---|---|---|---|---|---|---|---|---|---|
| | | | Material | Amount [% by mass] | Material | Amount [% by mass | | | | | |
| Ex. 4-3 | Before irradiation | PLA | Alginic acid/laminarin/fucoidan/mannitol | 0.5 | Titanium oxide | 3.0 | $5.30 \times 10^4$ | $9.60 \times 10^4$ | 1.81 | — | — |
| | After irradiation | PLA | Alginic acid/laminarin/fucoidan/mannitol | 0.5 | Titanium oxide | 3.0 | $5.10 \times 10^4$ | $8.90 \times 10^4$ | 1.75 | 96.23 | 92.71 |
| Ex. 4-4 | Before irradiation | PLA | Alginic acid/laminarin/fucoidan/mannitol | 1.0 | Titanium oxide | 3.0 | $3.60 \times 10^4$ | $7.20 \times 10^4$ | 2.00 | — | — |
| | After irradiation | PLA | Alginic acid/laminarin/fucoidan/mannitol | 1.0 | Titanium oxide | 3.0 | $3.80 \times 10^4$ | $7.10 \times 10^4$ | 1.87 | 105.56 | 98.61 |

TABLE 9-continued

| | | Bio-degrad-able resin | Biodegradation accelerator | | Photocatalytic additive | | Number average molecular weight Mn | Weight average molecular weight Mw | Poly-dispersity Mw/Mn | Mn reduction rate | Mw reduction rate |
|---|---|---|---|---|---|---|---|---|---|---|---|
| | | | Material | Amount [% by mass] | Material | Amount [% by mass | | | | | |
| Comp. Ex. 4-1 | Before irradiation | PLA | — | — | Titanium oxide | 3.0 | $9.30 \times 10^4$ | $15.00 \times 10^4$ | 1.61 | — | — |
| | After irradiation | PLA | — | — | Titanium oxide | 3.0 | $8.50 \times 10^4$ | $14.00 \times 10^4$ | 1.65 | 91.40 | 93.33 |

As shown in Table 8 and FIG. 14, the test pieces formed from the biodegradable resin compositions of Example 4-1 to Example 4-4, in which the alginic acid mixture was added, had lower breaking strengths after the metal halide lamp irradiation, or the biodegradable resin was ascertained to degrade more easily. In particular, it was ascertained that the breaking strength before the metal halide lamp irradiation may increase according to the amount of the alginic acid mixture (see Example 4-1, Comparative Example 4-1, Example 4-3, and Comparative Example 4-2), but after the metal halide lamp irradiation, the breaking strength decreases according to the addition of the alginic acid mixture, and the biodegradable resin more easily degrades. The test pieces formed from the biodegradable resin compositions of Example 4-2 and Example 4-4 had larger decreases in breaking strength after the metal halide lamp irradiation than the test pieces formed from the biodegradable resin compositions of Example 4-1 and Example 4-3, and this reveals that as the alginic acid mixture is added in a larger amount, the breaking strength decreases at a higher rate.

This is also explained by that more pores are observed in the SEM image of the test piece after the weathering test in Example 4-4 illustrated in FIG. 16B than in the SEM image of the test piece after the weathering test in Example 4-3 illustrated in FIG. 15B. The molecular weights of the biodegradable resins in the test pieces after the weathering test illustrated in FIG. 17 also revealed that the molecular weight peak of the test piece in Example 4-4 was shifted more to the left than in Example 4-3, and the biodegradable resin more easily degraded due to a reduction in molecular weight.

The above results reveal that as the additive such as the alginic acid mixture is added in a larger amount, the breaking strength is further lowered, or the biodegradable resin more easily degrades. After the metal halide lamp irradiation, the test piece had a lower breaking strength than that before the metal halide lamp irradiation, or the test piece decomposed. This reveals that photodegradation by titanium oxide decomposes the biodegradable resin.

Example 5

A biodegradable resin (a density of 1.25 g/cm$^3$) or a biodegradable resin composition prepared by adding, to the biodegradable resin, the hydrolysis accelerator used in Example 1 (the alginic acid mixture, alginic acid, sodium alginate, or fucoidan) at 0.5% by mass or 1.0% by mass was used to form a test piece, and the water absorption rate and the relation between hydrogen-ion exponents (pH) and water absorption amounts were determined.

[Evaluation]

(Water Absorption Rate)

After the mass of a test piece having predetermined dimensions was determined before water absorption, the test piece was immersed in water, and the mass of the test piece after water absorption was determined. The dimensions of the test piece and the method of immersing the test piece in water were in accordance with JIS K7209. For the immersion of a test piece in water, only the biodegradable resin (PLA) containing fucoidan at 1.0% by mass was subjected to the measurement method in Plastics-Determination of water absorption in accordance with JIS K7209 (water absorption rate (sample number n=4)), and the other test pieces were subjected to the measurement method in Plastics-Determination of water absorption in accordance with JIS K7209 (water absorption rate (sample number n=3)).

Subsequently, from the difference between the mass of the test piece after water absorption and the mass of the test piece before water absorption, the water content held in the test piece was calculated.

Finally, the rate of the water content held in the test piece to the mass of the test piece before water absorption was calculated as the water absorption rate [%].

(Water Absorption Amount)

The water absorption amount determined by the above method of a test piece having predetermined dimensions was divided by the volume of the test piece to calculate the water absorption amount in 1 cm$^3$ of a molded body. For the test piece formed from the biodegradable resin containing no hydrolysis accelerator, the water absorption amount in 1 cm$^3$ of a molded body was regarded as the water absorption amount in 1 cm$^3$ of a biodegradable resin.

Subsequently, the water absorption amount of the biodegradable resin contained in 1 cm$^3$ of a molded body was calculated. The water absorption amount in the biodegradable resin contained in 1 cm$^3$ of a molded body was calculated by multiplying the water absorption amount in 1 cm$^3$ of the molded body by the weight proportion of the biodegradable resin in the test piece.

The water absorption amount contained in 1 g of the biodegradable resin in the molded body was further calculated. The water absorption amount contained in 1 g of the biodegradable resin was calculated from the water absorption amount of the biodegradable resin contained in 1 cm$^3$ of the molded body and the density of the biodegradable resin (PLA).

Table 10 shows the water absorption amount of the molded body in 1 cm$^3$ of each test piece, the water absorption amount of the biodegradable resin contained in 1 cm$^3$ of each molded body, and the water absorption amount contained in 1 g of the biodegradable resin in each molded body.

Figure 18:
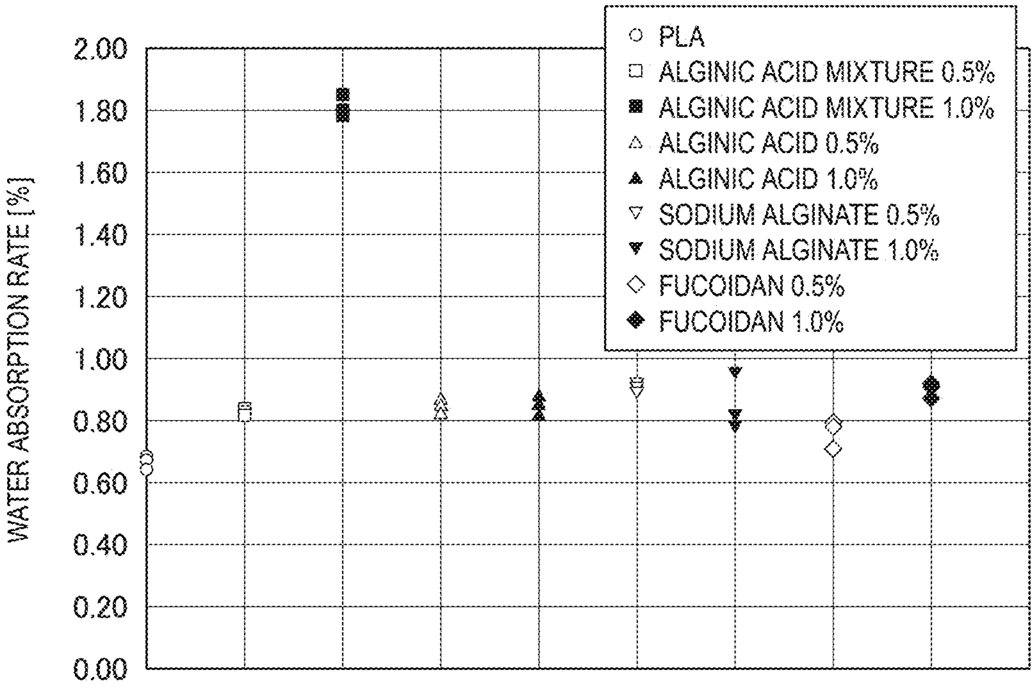
FIG. 18 is a graph illustrating the water absorption rates of a biodegradable resin and biodegradable resins containing biodegradation accelerators.
Figure 19:
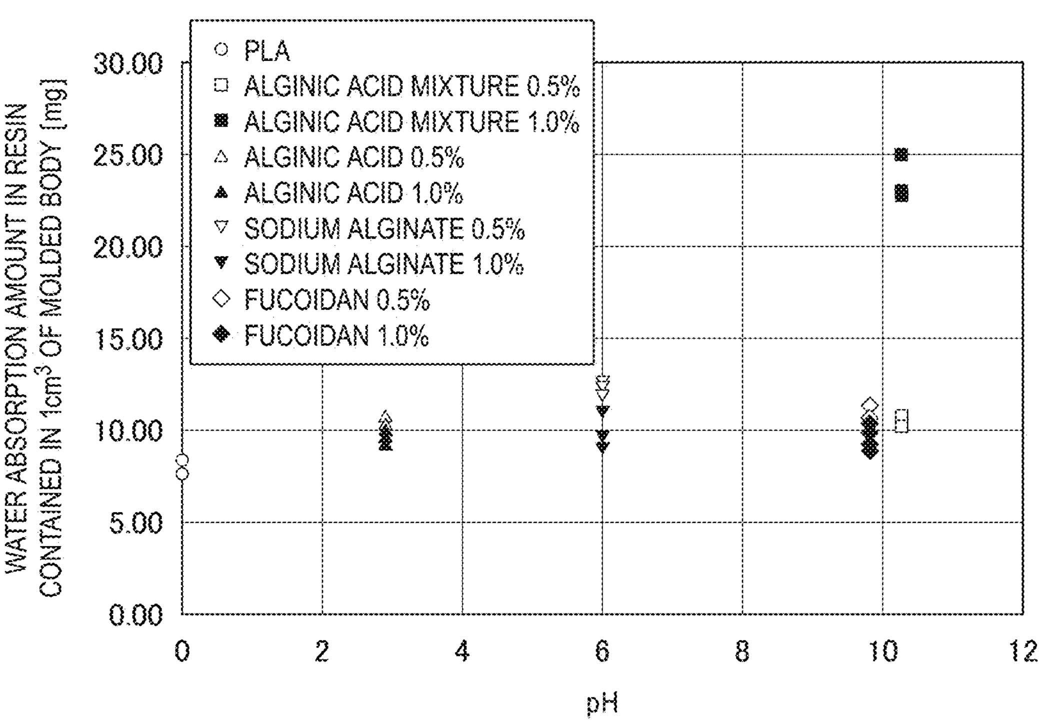
FIG. 19 is a graph illustrating the relation between hydrogen-ion exponents (pH) of a biodegradable resin and biodegradable resins containing biodegradation accelerators and water absorption amounts of biodegradable resins contained in 1 $cm^3$ of molded bodies.
Figure 20:
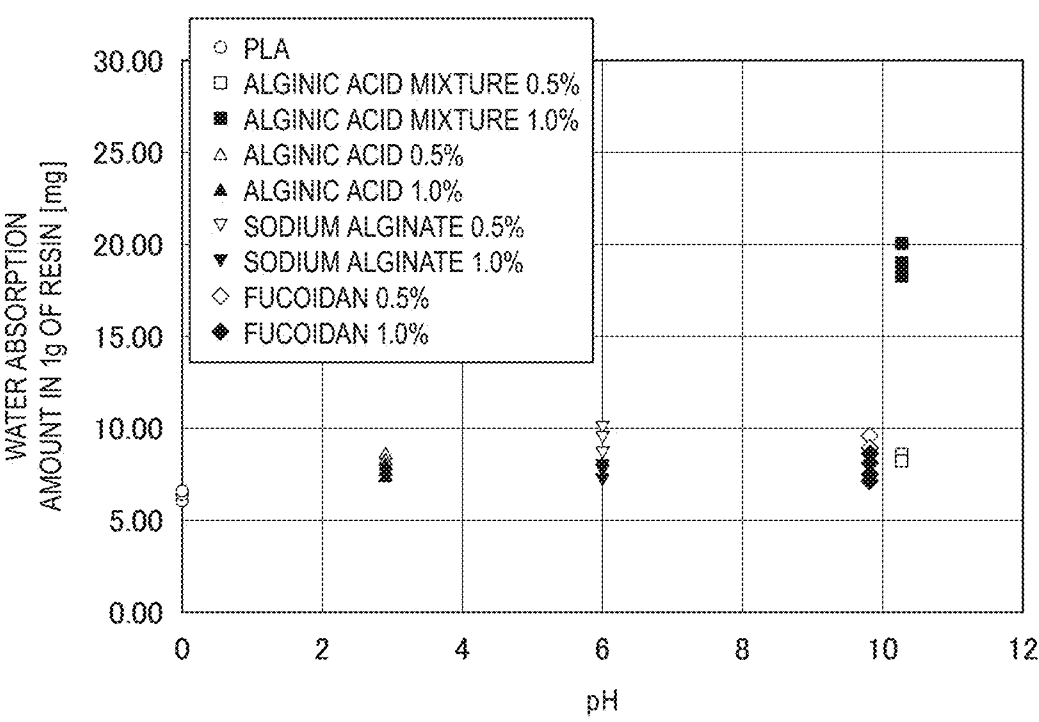
FIG. 20 is a graph illustrating the relation between hydrogen-ion exponents (pH) of a biodegradable resin and biodegradable resins containing biodegradation accelerators and water absorption amounts in 1 g of resins.

FIG. 18 is a graph illustrating water absorption rates of the test pieces; FIG. 19 is a graph illustrating the relation between hydrogen-ion exponents (pH) of hydrolysis accelerators and water absorption amounts of biodegradable resins contained in 1 cm$^3$ of molded bodies; and FIG. 20 is a graph illustrating the relation between hydrogen-ion exponents (pH) of hydrolysis accelerators and water absorption amounts in 1 g of biodegradable resins. In FIG. 19 and FIG. 20, the water absorption amount of a biodegradable resin (PLA) containing no hydrolysis accelerator is indicated at a position of pH=0 of the hydrolysis accelerator for convenience of comparison.

FIG. 20 and Table 10 reveal that the hydrolysis accelerator is preferably acidic or basic, and in 1 $cm^3$ of a molded body formed from a biodegradable resin containing the hydrolysis accelerator, the biodegradable resin has a water absorption amount of 0.009 g or more and preferably 0.01 g or more.

TABLE 10

| Biodegradable resin | Hydrolysis accelerator | Test piece | Water absorption rate [% by mass] | Water absorption amount of molded body per volume [mg/$cm^3$] | Water absorption amount of resin contained in molded body per volume [mg] | Water absorption amount in 1 g of biodegradable resin [mg/g] |
|---|---|---|---|---|---|---|
| PLA | None | n1 | 67.9 | 8.33 | 8.33 | 6.67 |
| | | n2 | 68.6 | 8.33 | 8.33 | 6.67 |
| | | n3 | 64.6 | 7.64 | 7.64 | 6.11 |
| | | Average | 67.0 | 8.10 | 8.10 | 6.48 |
| | Alginic acid/laminarin/ fucoidan/mannitol 0.5% by mass | n1 | 84.0 | 10.83 | 10.66 | 8.53 |
| | | n2 | 81.8 | 10.42 | 10.25 | 8.20 |
| | | n3 | 83.7 | 10.90 | 10.73 | 8.58 |
| | | Average | 83.2 | 10.72 | 10.55 | 8.44 |
| | Alginic acid/laminarin/ fucoidan/mannitol 1.0% by mass | n1 | 180.4 | 23.35 | 22.86 | 18.29 |
| | | n2 | 185.2 | 25.60 | 25.06 | 20.05 |
| | | n3 | 178.5 | 23.50 | 23.01 | 18.40 |
| | | Average | 181.3 | 24.15 | 23.64 | 18.91 |
| | Alginic acid 0.5% by mass | n1 | 84.1 | 10.28 | 10.11 | 8.09 |
| | | n2 | 82.7 | 10.42 | 10.25 | 8.20 |
| | | n3 | 86.1 | 10.83 | 10.66 | 8.53 |
| | | Average | 84.3 | 10.51 | 10.34 | 8.27 |
| | Alginic acid 1.0% by mass | n1 | 87.1 | 10.08 | 9.87 | 7.89 |
| | | n2 | 84.8 | 9.75 | 9.55 | 7.64 |
| | | n3 | 82.0 | 9.43 | 9.23 | 7.39 |
| | | Average | 84.6 | 9.75 | 9.55 | 7.64 |
| | Sodium alginate 0.5% by mass | n1 | 91.9 | 12.21 | 12.01 | 9.61 |
| | | n2 | 90.1 | 12.87 | 12.66 | 10.13 |
| | | n3 | 90.0 | 12.72 | 12.52 | 10.01 |
| | | Average | 90.7 | 12.60 | 12.40 | 9.92 |
| | Sodium alginate 1.0% by mass | n1 | 95.9 | 11.25 | 11.01 | 8.81 |
| | | n2 | 78.9 | 9.31 | 9.11 | 7.29 |
| | | n3 | 81.6 | 9.86 | 9.65 | 7.72 |
| | | Average | 85.5 | 10.14 | 9.93 | 7.94 |
| | Fucoidan 0.5% by mass | n1 | 79.4 | 11.46 | 11.28 | 9.02 |
| | | n2 | 78.4 | 10.07 | 9.91 | 7.93 |
| | | 3 | 71.0 | 10.83 | 10.66 | 8.53 |
| | | Average | 76.3 | 10.79 | 10.61 | 8.49 |
| | Fucoidan 1.0% by mass | n1 | 91.1 | 9.36 | 9.16 | 7.33 |
| | | n2 | 91.7 | 10.53 | 10.31 | 8.24 |
| | | n3 | 87.2 | 9.06 | 8.87 | 7.10 |
| | | n4 | 87.4 | 10.23 | 10.02 | 8.02 |
| | | Average | 89.3 | 9.80 | 9.59 | 7.67 |

As shown in FIG. 18 and Table 10, the molded body formed from the biodegradable resin containing a hydrolysis accelerator had a water absorption rate of 70% or more, whereas the molded body formed from the biodegradable resin containing no hydrolysis accelerator had a water absorption rate of less than 70%. The biodegradable resin (PLA) containing the alginic acid mixture, alginic acid, sodium alginate, or fucoidan as the hydrolysis accelerator tended to have a higher water absorption rate than the biodegradable resin (PLA) alone. In particular, the biodegradable resin containing the alginic acid mixture at 1.0% had a markedly higher water absorption rate.

FIG. 19 and Table 10 reveal that the hydrolysis accelerator is preferably acidic or basic, and in 1 $cm^3$ of a molded body formed from a biodegradable resin containing the hydrolysis accelerator, the biodegradable resin has a water absorption amount of 0.009 g or more and preferably 0.01 g or more.

Embodiments of the present disclosure have been described, but the embodiments are illustrative examples of apparatuses and methods for embodying the technical ideas of the present disclosure, and the technical ideas of the pres3ent disclosure are not intended to specify the material, shape, structure, configuration, or the like of the components. Various modifications can be made in the technical ideas of the present disclosure within the technical scope defined by the claims.

The invention claimed is:

1. A biodegradable resin composition having water holding properties, comprising:

a biodegradable resin capable of holding 0.007 g or more and 15.0 g or less of water relative to 1 g of the biodegradable resin, and a seaweed-derived polysaccharide as a hydrolysis accelerator that accelerates hydrolysis of the biodegradable resin, wherein the hydrolysis accelerator comprises at least one of fucoidan, laminarin, alginic acid, or an alginate, and the hydrolysis accelerator is present in an amount of 0.01% by mass or more and 1.0% by mass or less relative to the biodegradable resin.

2. The biodegradable resin composition according to claim 1, wherein the alginate is at least one of sodium alginate, potassium alginate, or calcium alginate.

3. The biodegradable resin composition according to claim 2, wherein the hydrolysis accelerator is acidic or basic.

4. The biodegradable resin composition according to claim 2, wherein the biodegradable resin composition contains a photocatalytically active substance that decomposes the biodegradable resin.

5. The biodegradable resin composition according to claim 1, wherein the hydrolysis accelerator is acidic or basic.

6. The biodegradable resin composition according to claim 5, wherein the biodegradable resin composition contains a photocatalytically active substance that decomposes the biodegradable resin.

7. The biodegradable resin composition according to claim 1, wherein the biodegradable resin composition contains a photocatalytically active substance that decomposes the biodegradable resin.

8. The biodegradable resin composition according to claim 1, wherein the biodegradable resin composition contains an organic material.

9. A molded body formed from the biodegradable resin composition according to claim 1.

10. The molded body according to claim 9, wherein the molded body is capable of holding 0.009 g or more and 15.0 g or less of water relative to the biodegradable resin contained in 1 $cm^3$ of the molded body.

* * * * *